US012367671B2

United States Patent
Unno

(10) Patent No.: US 12,367,671 B2
(45) Date of Patent: Jul. 22, 2025

(54) IMAGE PROCESSING DEVICE AND IMAGE PROCESSING METHOD FOR DETERMINING ACTIVITY OF A PLANT BASED ON A CAMERA IMAGE

(71) Applicant: SONY GROUP CORPORATION, Tokyo (JP)

(72) Inventor: Keisuke Unno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 256 days.

(21) Appl. No.: 17/911,641

(22) PCT Filed: Feb. 3, 2021

(86) PCT No.: PCT/JP2021/003932
§ 371 (c)(1),
(2) Date: Sep. 14, 2022

(87) PCT Pub. No.: WO2021/192642
PCT Pub. Date: Sep. 30, 2021

(65) Prior Publication Data
US 2023/0146206 A1     May 11, 2023

(30) Foreign Application Priority Data

Mar. 25, 2020    (JP) ................................. 2020-054632

(51) Int. Cl.
*G06V 10/00* (2022.01)
*G06T 3/40* (2006.01)
(Continued)

(52) U.S. Cl.
CPC .............. *G06V 20/188* (2022.01); *G06T 3/40* (2013.01); *G06T 5/50* (2013.01); *G06V 10/28* (2022.01);
(Continued)

(58) Field of Classification Search
CPC ...... G06V 20/188; G06V 20/17; G06V 10/28; G06V 10/751; G06V 10/30;
(Continued)

(56) References Cited

U.S. PATENT DOCUMENTS

2007/0030998 A1\* 2/2007 O'Hara .................. G06V 20/13
382/100
2017/0308750 A1 10/2017 Shriver
(Continued)

FOREIGN PATENT DOCUMENTS

CN      107991245 A    5/2018
JP      2017-046639 A  3/2017
(Continued)

OTHER PUBLICATIONS

Xue, Jinru, and Baofeng Su. "Significant remote sensing vegetation indices: A review of developments and applications." Journal of sensors 2017.1 (2017): 1353691. (Year: 2017).\*
(Continued)

*Primary Examiner* — Li Liu
(74) *Attorney, Agent, or Firm* — CHIP LAW GROUP

(57) ABSTRACT

Provided are a device and a method of generating and outputting a corrected image including high-precision vegetation index values such as NDVI values in a vegetation portion region on the basis of an image in which a vegetation portion and a soil portion coexist. The device includes a vegetation index value set image correcting section that generates a corrected image of a vegetation index value set image in which a vegetation index value such as an NDVI value is set as a pixel value. The vegetation index value set image correcting section calculates, for each of pixels constituting the vegetation index value set image, an average pixel value of the pixel and neighboring pixels, generates an averaged image in which the calculated average pixel values
(Continued)

are set, generates a binarized image by binarizing a difference image between the vegetation index value set image and the averaged image in accordance with a specified threshold, and generates, as the corrected image of the vegetation index value set image, a multiplication image by multiplying the vegetation index value set image and the binarized image.

17 Claims, 20 Drawing Sheets

(51) Int. Cl.
    *G06T 5/50*         (2006.01)
    *G06V 10/28*       (2022.01)
    *G06V 10/75*       (2022.01)
    *G06V 20/10*       (2022.01)

(52) U.S. Cl.
CPC .. *G06V 10/751* (2022.01); *G06T 2207/20216* (2013.01); *G06T 2207/20224* (2013.01); *G06T 2207/30188* (2013.01)

(58) Field of Classification Search
CPC . G06T 2207/30188; G06T 2207/10032; G06T 2207/20224; G06T 5/70; G06T 7/254
See application file for complete search history.

(56) References Cited

U.S. PATENT DOCUMENTS

| | | | |
|---|---|---|---|
| 2018/0373932 A1* | 12/2018 | Albrecht | G06V 20/188 |
| 2019/0228224 A1* | 7/2019 | Guo | G06N 7/01 |
| 2019/0228225 A1* | 7/2019 | Guo | G06V 20/188 |
| 2021/0158527 A1* | 5/2021 | Logie | G06T 7/0016 |
| 2021/0304368 A1* | 9/2021 | Takashima | G06V 20/188 |
| 2022/0366668 A1* | 11/2022 | Ito | G01N 21/31 |

FOREIGN PATENT DOCUMENTS

| | | |
|---|---|---|
| JP | 2020-027033 A | 2/2020 |
| WO | 2018/034166 A1 | 2/2018 |

OTHER PUBLICATIONS

Elmore, Andrew J., et al. "Quantifying vegetation change in semi-arid environments: precision and accuracy of spectral mixture analysis and the normalized difference vegetation index." Remote sensing of environment 73.1 (2000): 87-102. (Year: 2000).*

Jiang, Zhangyan, et al. "Analysis of NDVI and scaled difference vegetation index retrievals of vegetation fraction." Remote sensing of environment 101.3 (2006): 366-378. (Year: 2006).*

International Search Report and Written Opinion of PCT Application No. PCT/JP2021/003932, issued on Apr. 13, 2021, 09 pages of ISRWO.

* cited by examiner

F I G. 5
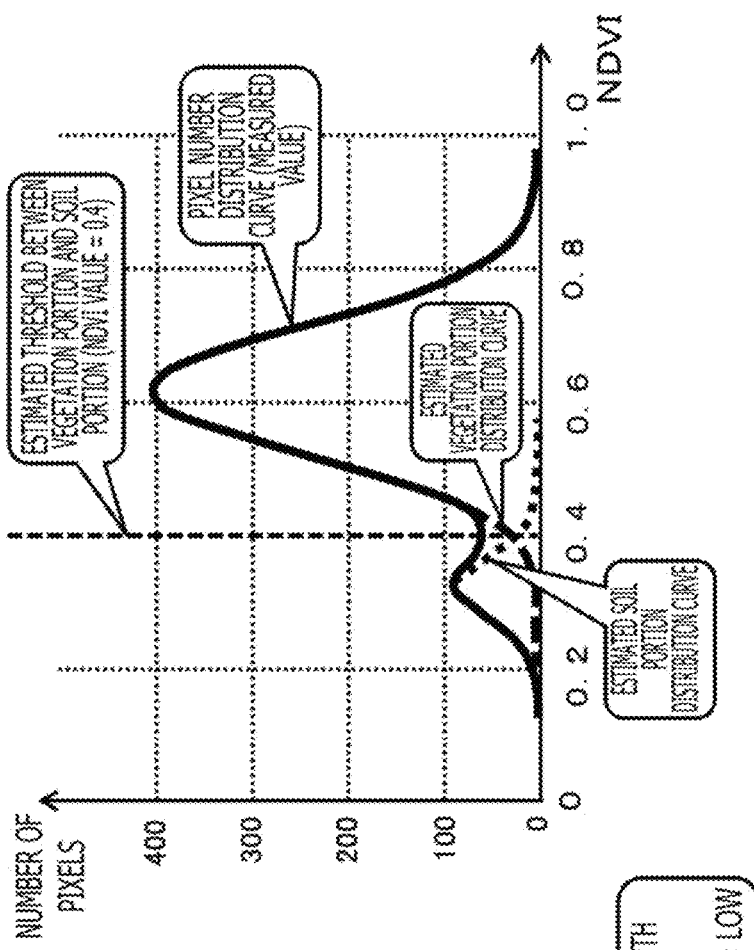
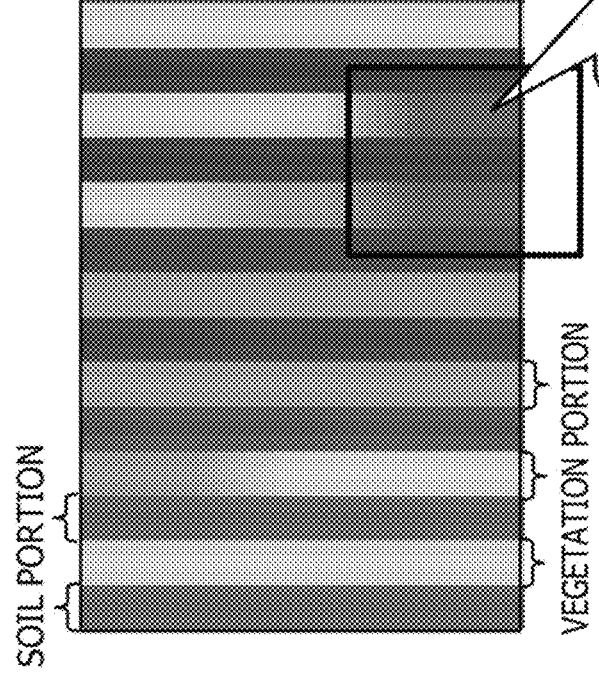

FIG. 6
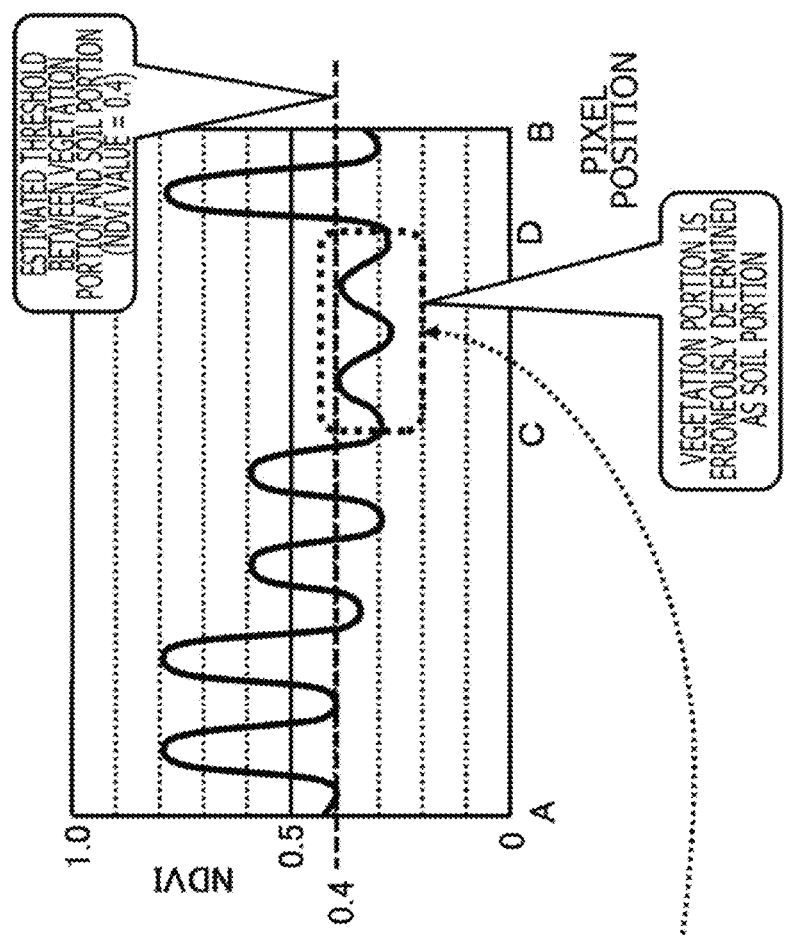
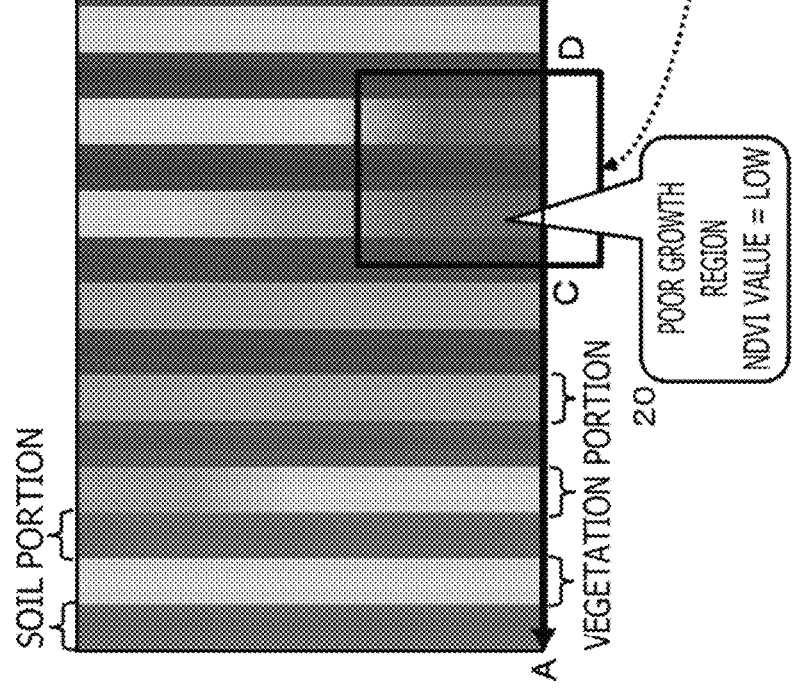

FIG. 9
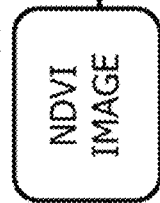
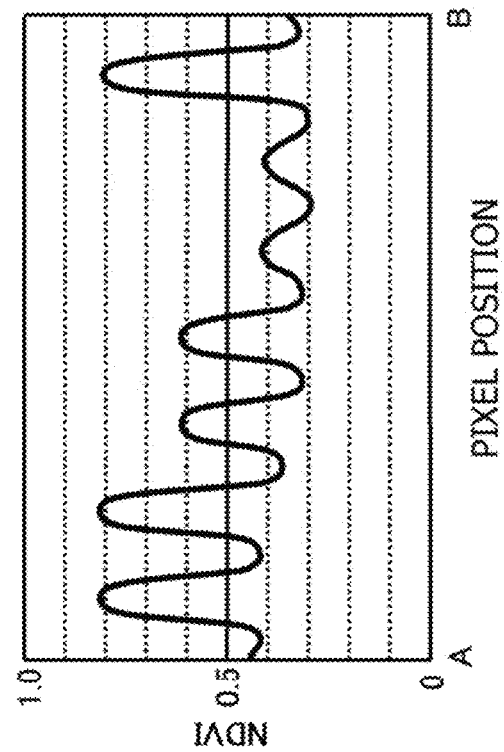
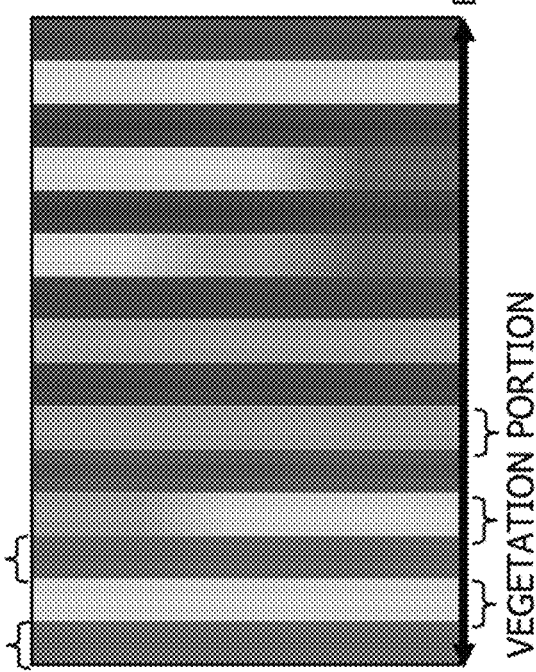

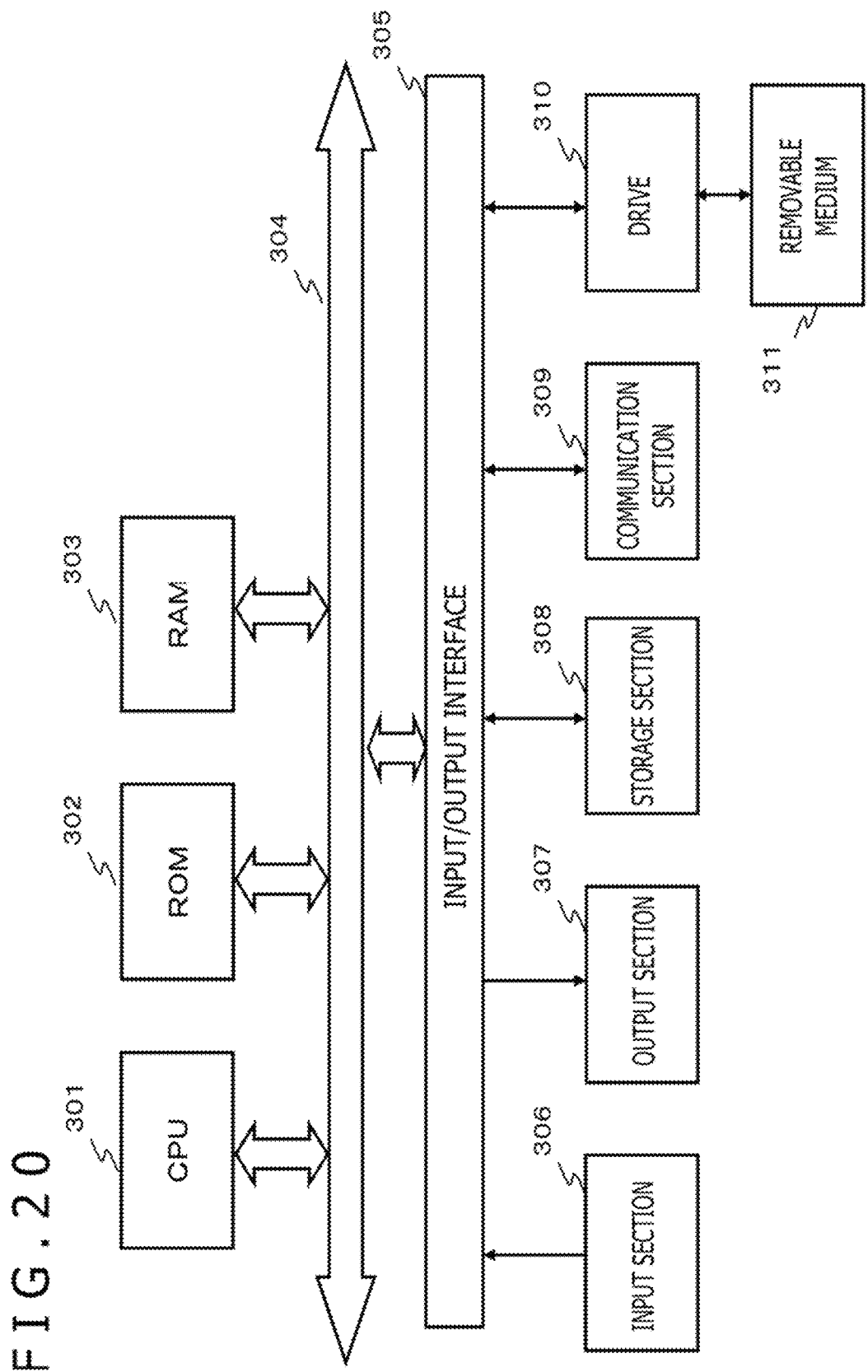

IMAGE PROCESSING DEVICE AND IMAGE PROCESSING METHOD FOR DETERMINING ACTIVITY OF A PLANT BASED ON A CAMERA IMAGE

CROSS REFERENCE TO RELATED APPLICATIONS

This application is a U.S. National Phase of International Patent Application No. PCT/JP2021/003932 filed on Feb. 3, 2021, which claims priority benefit of Japanese Patent Application No. JP 2020-054632 filed in the Japan Patent Office on Mar. 25, 2020. Each of the above-referenced applications is hereby incorporated herein by reference in its entirety.

TECHNICAL FIELD

The present disclosure relates to an image processing device, an image processing method, and a program. More specifically, the present disclosure relates to an image processing device, an image processing method, and a program for determining the activity of a plant on the basis of a camera image.

BACKGROUND ART

There has been a technology of capturing an image of a variety of plants including crops, flowers, or trees with a camera mounted on a drone or the like, for example, and measuring the activity of each plant by analyzing the captured image.

One example of a vegetation index that indicates a plant activity is an NDVI (Normalized Difference Vegetation Index).

An NDVI of a plant included in a camera image is calculated through analysis of the camera image, whereby the activity of the plant in the image can be estimated.

It is to be noted that one example of a conventional technology about an NDVI which is a vegetation index indicating a plant activity is described in PTL 1 (PCT Patent Publication No. WO2018/034166).

For example, in a farm where trees, flowers, vegetables such as green onions, cabbages, Chinese cabbages, or spinaches, etc. are grown, plants to be grown are usually planted in fixed lines or lines where respective linear "ridges" are formed.

That is, cultivation is carried out while vegetation portion lines such as "ridges" on which plants to be grown are planted are formed at a fixed interval.

As a result, vegetation portion lines where plants to be grown are planted and soil portion lines where no plant is planted are alternately formed.

When vegetation portion lines are formed at an interval in the abovementioned manner, plants to be grown can be exposed to plenty of sunshine. Moreover, the soil portion lines can be used as walkways so that the related works are facilitated. Thus, there are many advantages.

However, if an image of a farm where vegetation portion lines and soil portion lines coexist is captured from above with a camera mounted on a drone or the like, the captured image includes the soil portion lines as well as the vegetation portion lines.

When an NDVI value which is a vegetation index value is calculated from this image, a process of calculating the NDVI value is based on pixel value data that includes pixel values of a part of the soil portion lines. This causes a problem that precise vegetation index values in vegetation portions only cannot be calculated.

CITATION LIST

Patent Literature

[PTL 1]
 PCT Patent Publication No. WO2018/034166

SUMMARY

Technical Problem

The present disclosure has been made in view of the abovementioned problem, for example, and an object thereof is to provide an image processing device, an image processing method, and a program for, in a configuration of determining a plant activity on the basis of a camera image, precisely calculating a vegetation index which indicates a plant activity such as an NDVI value of a plant in a vegetation portion line on the basis of an image obtained by capturing a farm where the vegetation portion line and a soil portion line coexist.

When the configuration and processes according to the present disclosure are applied, the activity of a plant can be determined with high precision.

Solution to Problem

A first aspect of the present disclosure is an image processing device including a vegetation index value set image correcting section that receives an input of a vegetation index value set image in which a vegetation index value is set as a pixel value and that generates a corrected image of the vegetation index value set image, the vegetation index value indicating a plant activity, in which the vegetation index value set image correcting section calculates, for each of pixels constituting the vegetation index value set image, an average pixel value of the pixel and neighboring pixels, and generates an averaged image in which the calculated average pixel values are set, generates a binarized image by binarizing a difference image between the vegetation index value set image and the averaged image in accordance with a specified threshold, and generates, as the corrected image of the vegetation index value set image, a multiplication image by multiplying the vegetation index value set image and the binarized image.

Furthermore, a second aspect of the present disclosure is an image processing method that is executed in an image processing device.

The image processing device includes a vegetation index value set image correcting section that receives an input of a vegetation index value set image in which a vegetation index value indicating a plant activity is set as a pixel value and that generates a corrected image of the vegetation index value set image. The method includes causing the vegetation index value set image correcting section to calculate, for each of pixels constituting the vegetation index value set image, an average pixel value of the pixel and neighboring pixels, and generate an averaged image in which the calculated average pixel values are set, generate a binarized image by binarizing a difference image between the vegetation index value set image and the averaged image in accordance with a specified threshold, and generate, as the corrected image of the vegetation index value set image, a multiplication image by multiplying the vegetation index value set image and the binarized image.

Furthermore, a third aspect of the present disclosure is a program for causing an image processing device to execute image processing.

The image processing device includes a vegetation index value set image correcting section that receives an input of a vegetation index value set image in which a vegetation index value indicating a plant activity is set as a pixel value and that generates a corrected image of the vegetation index value set image. The program causes the vegetation index value set image correcting section to perform a process of calculating, for each of pixels constituting the vegetation index value set image, an average pixel value of the pixel and neighboring pixels, and generating an averaged image in which the calculated average pixel values are set, a process of generating a binarized image by binarizing a difference image between the vegetation index value set image and the averaged image in accordance with a specified threshold, and a process of generating, as the corrected image of the vegetation index value set image, a multiplication image by multiplying the vegetation index value set image and the binarized image.

It is to be noted that the program according to the present disclosure can be provided by a recording medium or communication medium for providing the program in a computer readable format to an information processing device or a computer system that is capable of executing various program codes, for example. Since the program is provided in a computer readable format, processing in accordance with the program is realized in the information processing device or the computer system.

Any other objects, features, and advantages of the present disclosure will become apparent from the detailed description based on an embodiment and attached drawings which are described later. It is to be noted that, in the present description, a system refers to a logical set structure including a plurality of devices, and the devices included in the structure are not necessarily included in the same casing.

According to the configuration of one embodiment of the present disclosure, a device and a method of generating and outputting a corrected image including a high-precision vegetation index value such as an NDVI value in a vegetation portion region on the basis of an image, in which the vegetation portion and a soil portion coexist, are implemented.

Specifically, the device includes a vegetation index value set image correcting section that generates a corrected image of a vegetation index value set image in which a vegetation index value such as an NDVI value is set as a pixel value, for example. The vegetation index value set image correcting section calculates, for each of pixels constituting the vegetation index value set image, an average pixel value of the pixel and neighboring pixels, generates an averaged image in which the average pixel value is set, generates a binarized image by binarizing a difference image between the vegetation index value set image and the averaged image in accordance with a specified threshold, and generates, as the corrected image of the vegetation index value set image, a multiplication image obtained by multiplying the vegetation index value set image and the binarized image.

With this configuration, the device and the method of generating and outputting a corrected image including a high-precision vegetation index value such as an NDVI value in a vegetation portion region on the basis of an image in which the vegetation portion and a soil portion coexist.

It is to be noted that the effects described in the present description are just examples, and thus, are not limited. In addition, any additional effect may be provided.

BRIEF DESCRIPTION OF DRAWINGS

FIGS. 5A and 5B are diagrams for explaining problems in an NDVI image which is generated on the basis of a captured image of a farm.

FIGS. 6A and 6B are diagrams for explaining problems in an NDVI image which is generated on the basis of a captured image of a farm.

FIG. 9 is a diagram for explaining one example of an NDVI image which is an input image to the NDVI image correcting section.

FIG. 20 is a diagram for explaining a hardware configuration example of the image processing device according to the present disclosure.

DESCRIPTION OF EMBODIMENT

Figure 1:
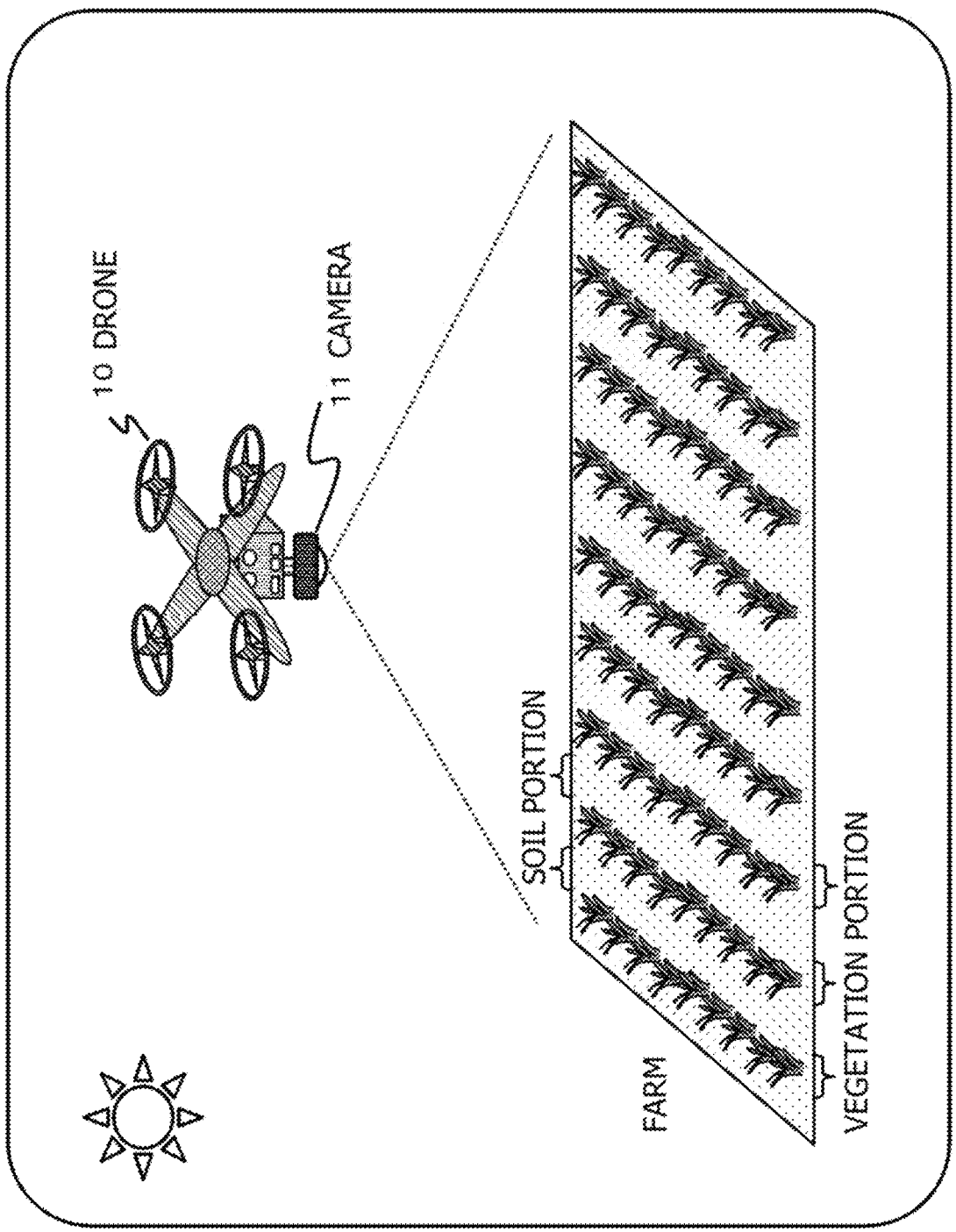
FIG. 1 is a diagram for explaining an example of capturing an image from above a farm.

Hereinafter, an image processing device, an image processing method, and a program according to the present disclosure will be explained with reference to the drawings. It is to be noted that the explanation will be given in accordance with the following order.

1. Index (vegetation index) indicating activity of plant
2. Example of conventional process of calculating NDVI value which is activity index value of plant, and problems
3. Details of configuration and processes in image processing device according to present disclosure
   3-1. Process that is executed by averaging section 121
   3-2. Process that is executed by subtraction section 122
   3-3. Process that is executed by binarization section 123
   3-4. Process that is executed by multiplication section 124
   3-5. Process that is executed by multiplication image averaging section 125
4. Sequence of processes that are executed by image processing device according to present disclosure
5. Hardware configuration example of image processing device
6. Conclusion of configuration according to present disclosure

1. Index (Vegetation Index) Indicating Activity of Plant

First, an index (vegetation index) that indicates the activity of a plant will be explained.

As previously explained, there has been a technology of capturing an image of a variety of plants including crops, flowers, and trees with a camera mounted on a drone or the like, for example, analyzing the captured image, and measuring the activity of each plant.

Examples of an index (vegetation index) that indicates the activity of a plant include an NDVI (Normalized Difference Vegetation Index).

In most cases, an NDVI is calculated in accordance with the following (Expression 1).

$$NDVI=(NIR-RED)/(NIR+RED) \quad \text{(Expression 1)}$$

in the above (Expression 1),

RED (infrared) and NIR (near infrared) represent the intensity (pixel value) of a RED (infrared) wavelength (approximately 0.63 to 0.69 μm) and the intensity (pixel value) of an NIR (near infrared) wavelength (approximately 0.76 to 0.90 μm) in each pixel in an image captured by a camera (multi-spectral camera) that is capable of taking an image of two types of wavelengths of infrared rays and infrared rays simultaneously.

Pixel values which indicate the RED (infrared) intensity and the NIR (near infrared) intensity acquired from a camera image are obtained by measuring reflection light from a subject.

In plants, chlorophyll absorbs light of an infrared wavelength to perform photosynthesis, and light that cannot be absorbed is released as diffuse reflection from leaves. Therefore, it can be determined that a leaf that absorbs light of a reddish wavelength has a high activity.

For example, a camera 11 is mounted on a drone 10, as depicted in FIG. 1, to capture an image of a farm from above. The camera 11 is a multi-spectral camera which simultaneously captures a RED wavelength (infrared) and an NRI wavelength (near infrared).

In the farm, trees, flowers, vegetables such as green onions, cabbages, Chinese cabbages, or spinaches, etc. are grown, for example.

As depicted in FIG. 1, plants to be grown are planted in fixed lines or vegetation portion lines along which respective linear "ridges" are formed, for example.

A plurality of vegetation portion lines is formed at a fixed interval. As a result of setting vegetation portion lines at a fixed interval in this manner, plants to be grown can be exposed to plenty of sunshine. Moreover, the related works can be facilitated. Thus, there are many advantages.

However, this generates a configuration in which vegetation portion lines where plants to be grown are planted and soil portion lines where no plant is planted are alternately arranged in the farm, as depicted in FIG. 1.

When an image of the farm where vegetation portion lines and soil portion lines coexist, as depicted in FIG. 1, is captured with the camera 11 mounted on the drone 10, the vegetation portion lines and the soil portion lines coexist in the captured image.

When such an image is used to calculate an NDVI value which is a vegetation index value, an NDVI value calculating process based on pixel value data including pixel values of the soil portion lines is performed. Therefore, precise vegetation index values in the vegetation portions only cannot be calculated.

Figure 2:
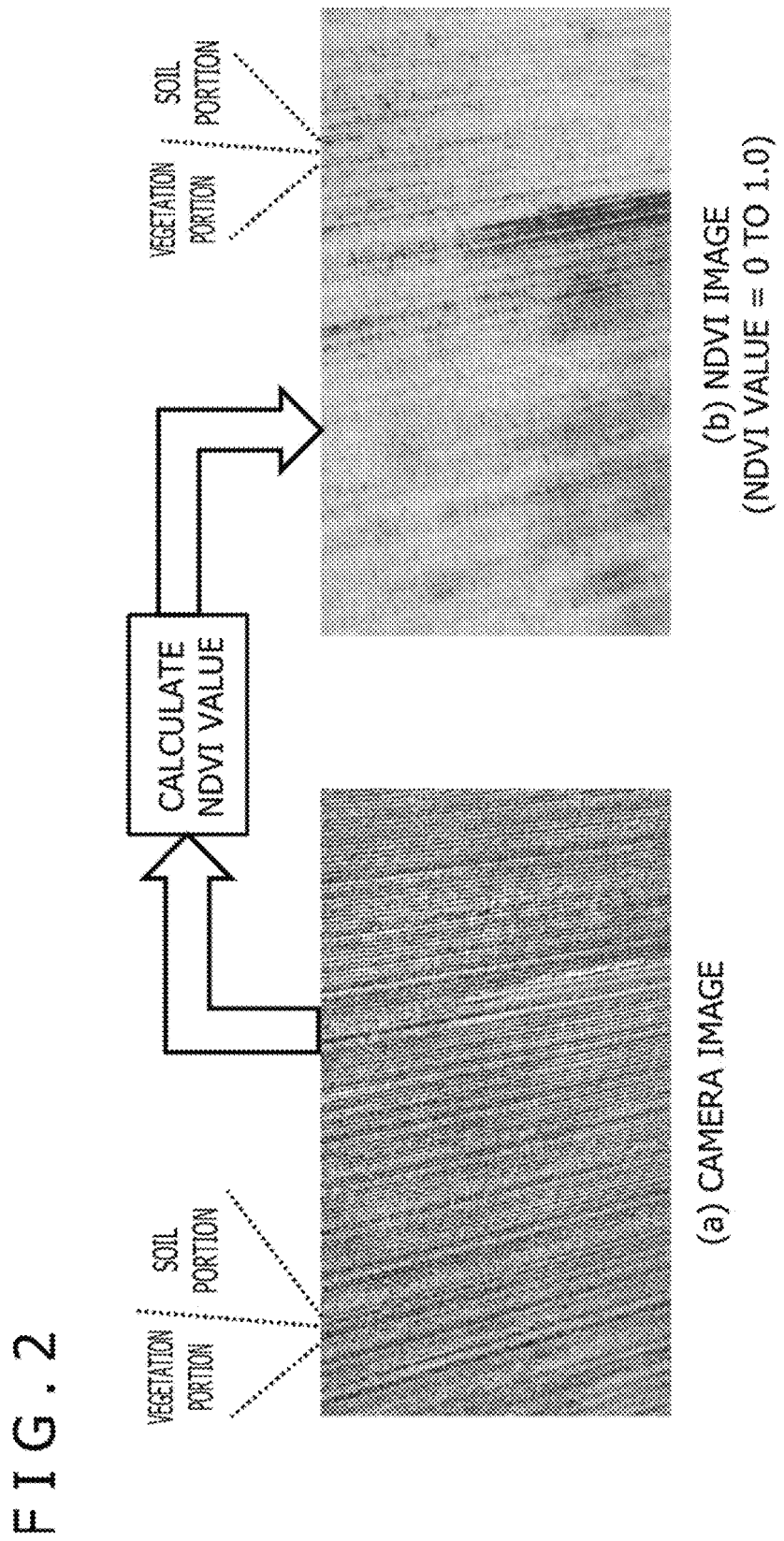
FIG. 2 is a diagram for explaining a captured image of a farm and an NDVI image which is generated on the basis of the captured image.

FIG. 2 depicts an example of (a) camera image and an example of (b) NDVI image.

NDVI values corresponding to pixels in the camera image in FIG. 2(*a*) are calculated according to the abovementioned Expression (1). That is, $$NDVI=(NIR-RED)/(NIR+RED) \quad \text{(Expression 1)}$$

NDVI values corresponding to the pixels are calculated according to Expression (1).

One example of an image that is generated on the basis of the calculation result is (b) NDVI image in FIG. 2.

Pixel values that are set for the respective pixels in the NDVI image correspond to NDVI values.

Each NDVI value is set to NDVI=0.0 to 1.0, for example. Each white portion (high-intensity portion) in the (b) NDVI image in FIG. 2 indicates a region having a high NDVI value (close to 1.0) and having a high plant activity.

Each black portion (low-intensity portion) in the (b) NDVI image in FIG. 2 indicates a region having a low NDVI value (close to 0.0) and having a low plant activity.

However, black portions (low-intensity portions) in the (b) NDVI image in FIG. 2 include soil portions where no plant to be grown is planted. Therefore, precise activity index values in the vegetation portions only cannot be obtained by calculating, for example, the total average value of pixel values (NDVI values) in this image.

2. Example of Conventional Process of Calculating NDVI Value which is Activity Index Value of Plant, and Problems Next, an example of a conventional process of calculating an NDVI value which is a plant activity index value and problems thereof will be explained with reference to the drawings in FIG. 3 and later.

Figure 3:
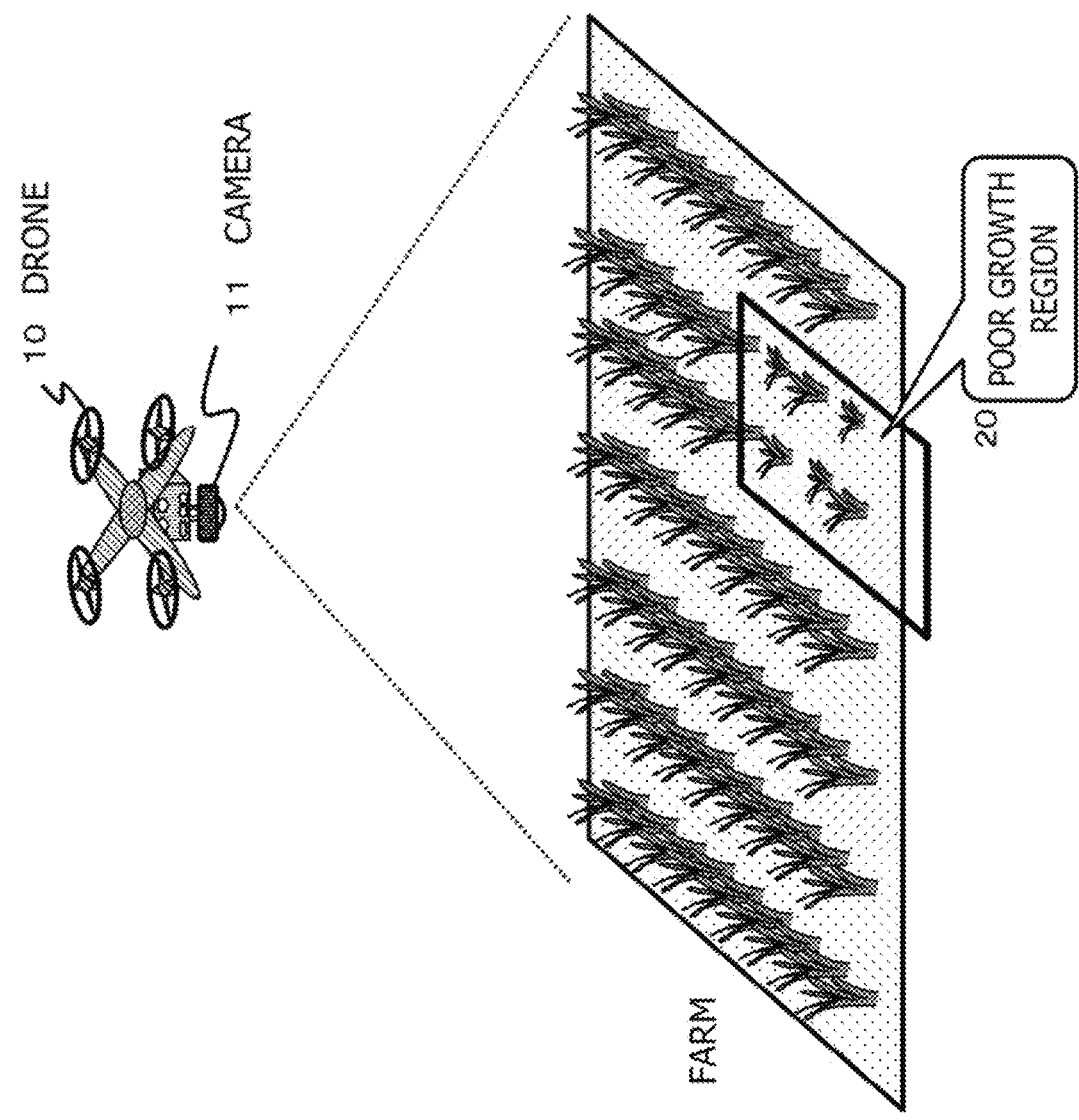
FIG. 3 is a diagram for explaining problems in an NDVI image which is generated on the basis of a captured image of a farm.

FIG. 3 is a diagram depicting an example of capturing an image of a farm where vegetation portion lines and soil portion lines coexist, from above with the camera 11 mounted on the drone 10, in the similar manner as that in FIG. 1 which has been previously explained.

It is assumed that a portion of the farm is a poor growth region 20, as depicted in FIG. 3.

Figure 4:
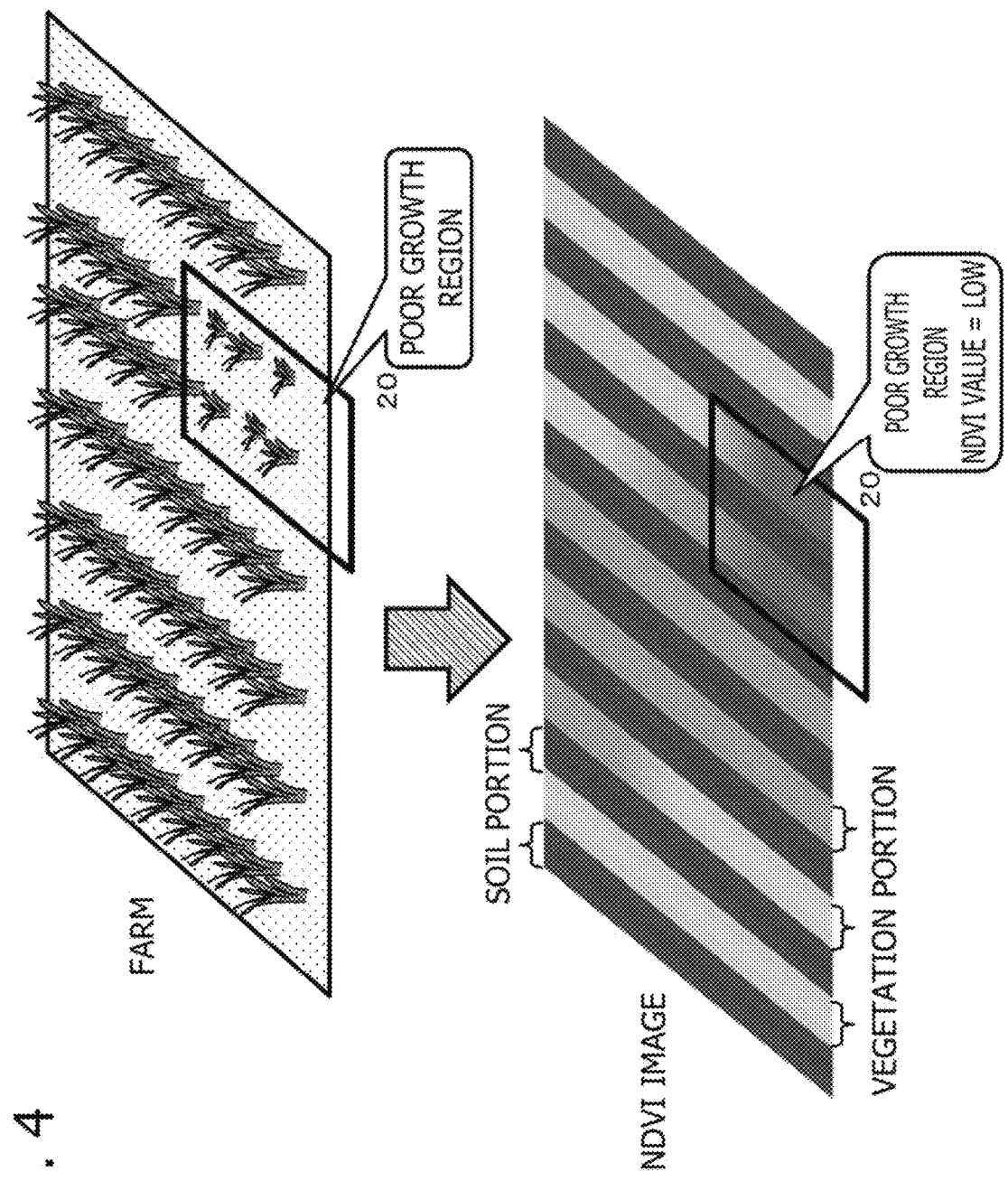
FIG. 4 is a diagram for explaining problems in an NDVI image which is generated on the basis of a captured image of a farm.

When an NDVI image is generated from a captured image of the farm including the poor growth region 20, an image region, in the NDVI image, corresponding to the poor growth region 20 is a low-intensity image region where a pixel value (NDVI value) is low, as depicted in FIG. 4.

It is to be noted that, in the NDVI image in FIG. 4, high-intensity (white) lines correspond to the vegetation portion lines while low-intensity (gray-black) lines correspond to the soil portion lines.

It is to be noted that, for easy understanding of the explanation, NDVI images in FIG. 4 and later are schematic images in which vegetation portion lines are indicated by high-intensity (white) lines while soil portion lines are indicated by low-intensity (gray-black) lines such that the vegetation portion lines and the soil portion lines are clearly distinguished from each other. In an actual captured image, a boundary between lines is ambiguous. Hereinafter, in order to make it easy to understand processes according to the present disclosure, a schematic NDVI image in which a boundary between lines is clearly illustrated.

As depicted in FIG. 4, in an NDVI image that is generated on the basis of a captured image of a farm where vegetation portion lines and soil portion lines coexist, NDVI values of the vegetation portion lines and NDVI values of the soil portion lines coexist. Therefore, for example, even when the total average value of pixel values (NDVI values) in this image is calculated, precise activity index values (NDVI values) in the vegetation portions only cannot be obtained.

An example of a conventional process of calculating activity index values (NDVI values) of vegetation portions only on the basis of such an image will be explained with reference to FIGS. 5A, 5B, and later.

In FIGS. 5A and 5B, FIG. 5A depicts an NDVI image including the poor growth region 20, which is similar to that previously explained with reference to FIG. 4.

First, a histogram of pixel values (NDVI values) of all the pixels in the NDVI image is created.

In FIGS. 5A and 5B, FIG. 5B is a histogram of pixel values (NDVI values) of all the pixels in the NDVI image in FIG. 5A.

The histogram in FIG. 5B is a graph the horizontal axis of which indicates an NDVI value (0 to 1.0) and the vertical axis of which indicates the number of pixels.

A curve indicated by a solid line in the graph in FIG. 5B is a "pixel value distribution curve (measured value) corresponding to the NDVI values," that is, is a "histogram."

As depicted in FIG. 5B, the pixel value distribution curve has two peaks. It is inferred that the right peak, which is a large peak having a higher NDVI value, is a peak indicating a distribution of NDVI values of pixels corresponding to the vegetation portion lines.

On the other hand, it is inferred that the left peak, which is a small peak having a lower NDVI value, is a peak indicating a distribution of NDVI values of pixels corresponding to the soil portion lines.

On the basis of a result of this inference, a threshold, that is,
an "estimated threshold (NDVI value=0.4) between a vegetation portion and a soil portion" is defined, as illustrated in FIG. 5B.

As illustrated in FIG. 5B, an estimated distribution curve (estimated vegetation portion distribution curve) of the NDVI values of pixels corresponding to vegetation portions is added to the lower left region of the large peak having the higher NDVI value.

Furthermore, as illustrated in FIG. 5B, an estimated distribution curve (estimated soil portion distribution curve) of the NDVI values of pixels corresponding to soil portions is added to the lower right region of the small peak having the lower NDVI value.

An intersection point (NDVI value=0.4) of these estimated distribution curves is obtained, and the intersection point (NDVI value=0.4) is defined as an "estimated threshold (NDVI value=0.4) between a vegetation portion and a soil portion."

The estimated threshold is used to discriminate between a vegetation portion and a soil portion included in the NDVI image in FIG. 5A.

Specifically, a region having a pixel value (NDVI value) equal to the threshold=0.4 or greater is determined as a vegetation portion, and a region having a pixel value of less than the threshold=0.4 is determined as a soil portion.

Only a vegetation portion selected as a result of this determination, or a region determined as a vegetation portion having a pixel value equal to the threshold=0.4 or greater is regarded as a target the plant activity index value (NDVI value) of which is to be analyzed.

As a result of the region determination using this "threshold," regions each having a pixel value of the threshold=less than 0.4 are determined as solid portions so that these regions can be excluded from targets the plant activity index value (NDVI value) of which are to be calculated.

However, when the region determination using the "threshold" is made, there is a possibility that the poor growth region 20 included in the NDVI image in FIG. 5A is determined as a soil portion region.

A specific example thereof will be explained with reference to FIGS. 6A and 6B.

NDVI image in FIG. 6A is identical to NDVI image in FIG. 5A. That is, FIG. 6A depicts an NDVI image including the poor growth region 20 which is similar to that previously explained with reference to FIG. 4.

FIG. 6B depicts a graph indicating the NDVI value of a lowermost pixel line AB in the NDVI image in FIG. 6A.

The horizontal axis indicates the pixel position on the pixel line AB. The vertical axis indicates the NDVI value of each pixel.

As illustrated in the graph, the NDVI value of the pixel line AB forms a curve having a plurality of peaks and valleys formed at a fixed interval.

High NDVI value portions (peak portions) and low NDVI value portions (valley portions) correspond to vegetation portions and soil portions, respectively.

It is assumed that, by using the "estimated threshold (NDVI value=0.4) between a vegetation portion and a soil portion" which has been explained with reference to FIGS. 5A and 5B, a process for discriminating between vegetation portions and soil portions is performed on the graph in FIG. 6B.

A dotted line substantially at the center of the graph in FIG. 6B is a line indicating the estimated threshold (NDVI value=0.4).

A region having an NDVI value higher than the estimated threshold (NDVI value=0.4) is determined as a vegetation portion region while a region having an NDVI value lower than the estimated threshold is determined as a soil portion region.

However, as illustrated in FIG. 6B, a CD portion in FIG. 6B corresponding to the poor growth region 20 has low peaks. The peaks in the CD portion correspond to vegetation portions, but are determined as soil portion regions because these peaks each have an NDVI value that is lower than the estimated threshold (NDVI value=0.4).

Therefore, when the region determination using the "estimated threshold" is made, a problem that a vegetation portion including a poor growth region is erroneously determined as a soil portion arises.

3. Details of Configuration and Processes in Image Processing Device According to Present Disclosure Next, the details of the configuration and processes in an image processing device according to the present disclosure will be explained.

An image processing device according to the present disclosure is capable of solving the abovementioned problems and determining a plant activity with high precision.

That is, an image processing device according to the present disclosure is capable of precisely calculating a vegetation index which indicate a plant activity such as an NDVI value in a vegetation portion line on the basis of an image obtained by capturing a farm where vegetation portion lines and soil portion lines coexist.

When the configuration and processes according to the present disclosure are applied, a plant activity can be determined with high precision.

The details of the configuration and processes in an image processing device according to the present disclosure will be explained with reference to FIG. 7 and later.

Figure 7:
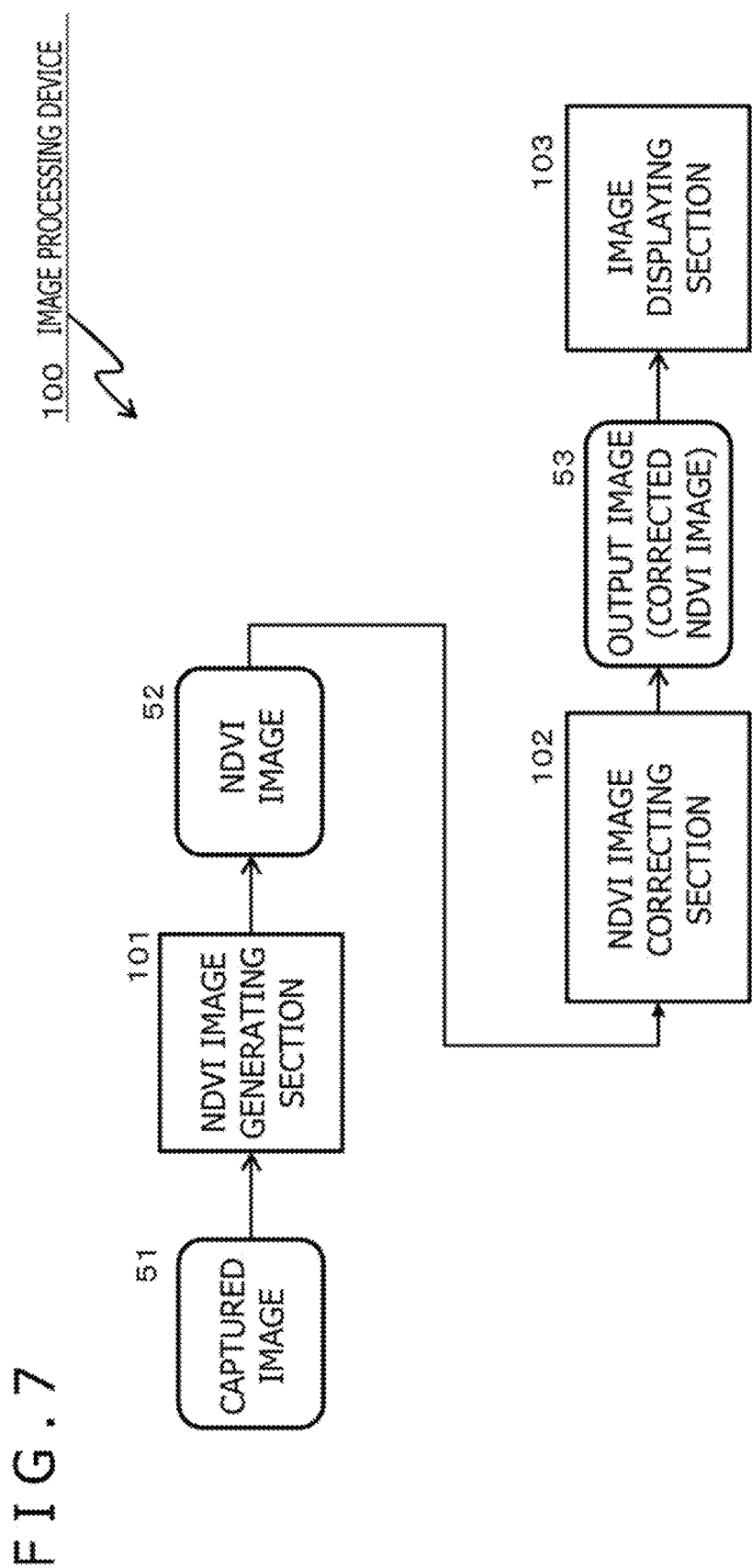
FIG. 7 is a diagram for explaining the configuration and processes in an image processing device according to the present disclosure.

FIG. 7 is a diagram depicting a configuration example of an image processing device 100 according to the present disclosure.

As depicted in FIG. 7, the image processing device 100 according to the present disclosure includes an NDVI image generating section 101, an NDVI image correcting section 102, and an image displaying section 103.

The NDVI image generating section 101 receives an input of a captured image 51, and generates an NDVI image 52.

The captured image 51 is captured by the camera 11 mounted on the drone 10 depicted in FIG. 1, for example.

The camera 11 is a multi-spectral camera. From the captured image 51, the intensity (pixel value) of an RED (infrared) wavelength (approximately 0.63 to 0.69 μm) and the intensity of an NIR (near infrared) wavelength (approximately 0.76 to 0.90 μm) in each pixel can be acquired.

The captured image 51 is inputted to the NDVI image generating section 101, and the NDVI image generating section 101 calculates the NDVI value of each pixel in the captured image 51 according to the abovementioned (Expression 1), that is, $$NDVI=(NIR-RED)/(NIR+RED) \quad \text{(Expression 1)},$$

in which RED (infrared) and NIR (near infrared) represent the intensity (pixel value) of a RED (infrared) wavelength (approximately 0.63 to 0.69 μm) and the intensity of an NIR (near infrared) wavelength (approximately 0.76 to 0.90 μm), respectively.

The NDVI image generating section 101 calculates the NDVI values of respective pixels in the captured image 51, and generates the NDVI image 52 in which the calculated pixel values (NDVI values) are set in respective pixels.

The NDVI image 52 is similar to the NDVI image in FIG. 5A or the NDVI image in FIG. 6A, for example.

As previously explained, the NDVI value is set to NDVI=0.0 to 1.0, for example. In the NDVI image in FIG. 5A or 6A, each white portion (high-intensity portion) indicates a region having a high NDVI value (close to 1.0), that is, a region having a high plant activity, and each black portion (low-intensity portion) indicates a region having a low NDVI value (close to 0.0), that is, a region having a low plant activity or being a soil portion region.

The NDVI image 52 generated by the NDVI image generating section 101 is inputted to the NDVI image correcting section 102.

The NDVI image correcting section 102 corrects the NDVI image 52 generated by the NDVI image generating section 101.

Specifically, an output image (corrected NDVI image) 53 in which a region assessed as a soil portion can be clearly distinguished from a region assessed as a vegetation portion included in the NDVI image 52 is generated, for example.

Alternatively, NDVI values in regions assessed as soil portions are eliminated, and an output image (corrected NDVI image) 53 which includes NDVI values in regions assessed as vegetation portions only, is generated.

The details of an image correcting process that is executed by the NDVI image correcting section 102 will be explained later.

The output image (corrected NDVI image) 53 generated by the NDVI image correcting section 102 is outputted to the image displaying section 103, and is displayed.

The output image (corrected NDVI image) 53 which is displayed on the image displaying section 103 is either
(a) an output image (corrected NDVI image) in which regions assessed as soil portions and regions assessed as vegetation portions are clearly distinguishable from each other, or
(b) an output image (corrected NDVI image) from which NDVI values in regions assessed as soil portions have been eliminated, and which includes NDVI values in regions assessed as vegetation portions only.

On the basis of either of the image (a) or (b) and the output image (corrected NDVI image) 53, the plant activity in each vegetation portion region can be precisely discerned.

It is to be noted that, in an embodiment which will be explained later, the image processing device 100 according to the present disclosure uses an "NDVI" as a vegetation index value to indicate an activity of a plant. However, this embodiment is one example, and the image processing device 100 according to the present disclosure can use a vegetation index value other than an "NDVI," as a vegetation index value to indicate an activity of a plant.

That is, an NDVI image is one example of the vegetation index value set image.

In addition, the NDVI image generating section 101 of the image processing device 100 depicted in FIG. 7 is one example of a vegetation index value set image generating section, and the NDVI image correcting section 102 is one example of a vegetation index value set image correcting section.

Hereinafter, an embodiment in which "NDVI" is used as a representative example of a vegetation index value will be explained.

The detailed configuration and process in the NDVI image correcting section 102 of the image processing device 100 depicted in FIG. 7 will be explained with reference to FIG. 8 and later.

Figure 8:
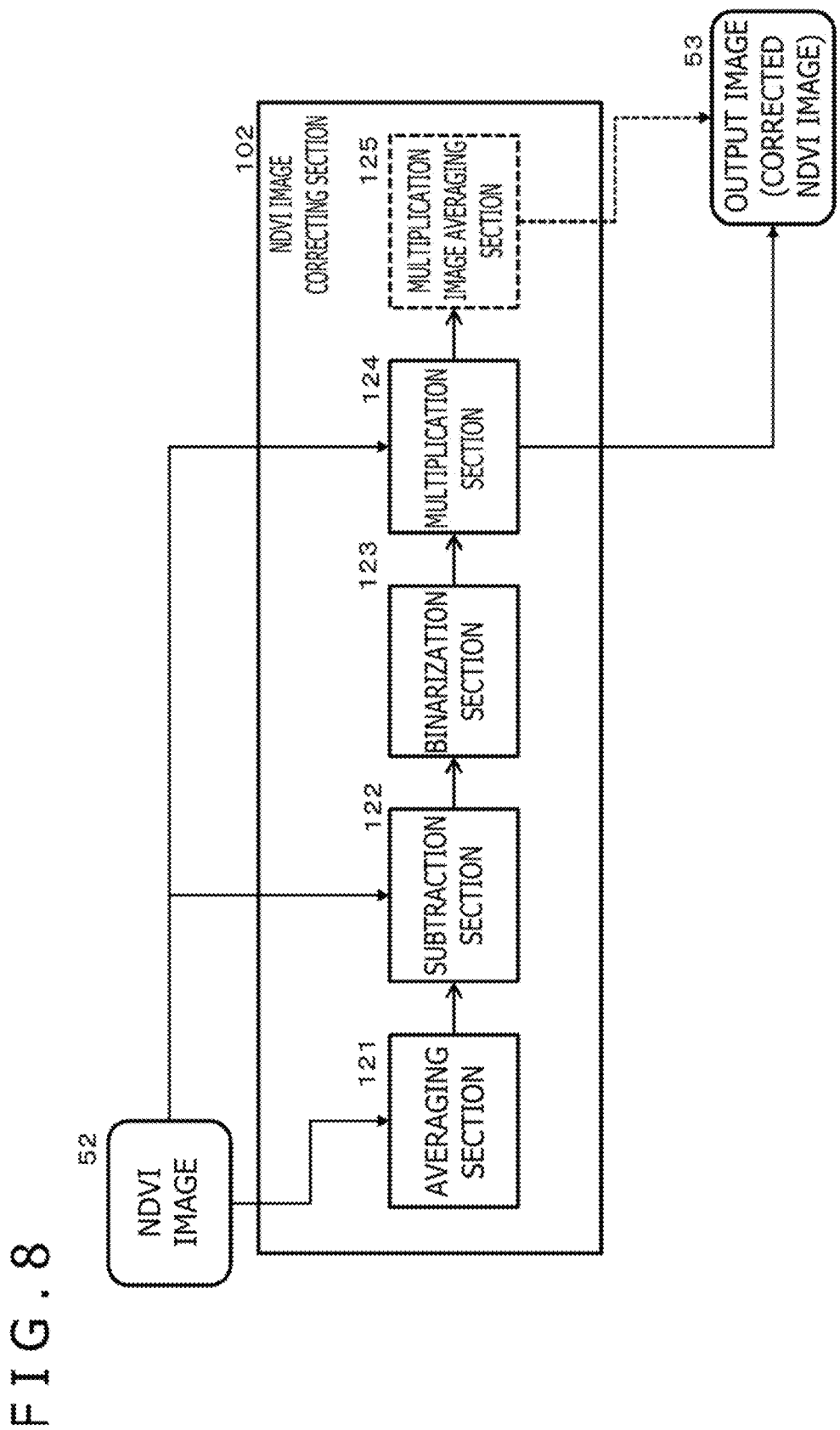
FIG. 8 is a diagram for explaining the configuration and processes in an NDVI image correcting section of the image processing device according to the present disclosure.

FIG. 8 is a block diagram depicting the detailed configuration of the NDVI image correcting section 102 of the image processing device 100 depicted in FIG. 7.

As depicted in FIG. 8, the NDVI image correcting section 102 of the image processing device 100 includes an averaging section 121, a subtraction section 122, a binarization section 123, a multiplication section 124, and a multiplication image averaging section 125.

It is to be noted that the multiplication image averaging section 125 is optional, and the multiplication image averaging section 125 may be omitted.

Hereinafter, the details of processes that are executed by these sections will be explained in order.

(3-1. Process that is Executed by Averaging Section 121)

First, a process that is executed by the averaging section 121 will be explained.

The NDVI image 52 generated by the NDVI image generating section 101 is inputted to the averaging section 121 of the NDVI image correcting section 102, and the averaging section 121 generates an averaged image of the inputted NDVI image 52.

FIG. 9 is a diagram depicting a specific example of the NDVI image 52 that is inputted to the averaging section 121, that is, the NDVI image 52 generated by the NDVI image generating section 101 disposed on a stage prior to the averaging section 121.

(1*a*) in FIG. 9 depicts an NDVI image that is similar to that previously explained with reference to FIG. 6A.

That is, the (1*a*) NDVI image in FIG. 9 is obtained by capturing a farm including the poor growth region 20 which has been explained with reference to FIG. 3, and is identical to those in FIGS. 4, 5A, and 6A. That is, an NDVI image in which a low pixel value (NDVI value) is set in a portion corresponding to the poor growth region 20, is depicted.

(1*b*) in FIG. 9 is a graph that is similar to that previously explained with reference to FIG. 6B, and illustrates an NDVI value of the lowermost pixel line AB in the (1*a*) NDVI image in FIG. 9.

The horizontal axis indicates the pixel position on the pixel line AB. The vertical axis indicates an NDVI value of each pixel.

The graph in (1*b*) in FIG. 9 is identical to that previously explained with reference to FIG. 6B. In this graph, the NDVI value of the pixel line AB forms a curve having a plurality of peaks and valleys formed at a fixed interval. Portions (peak portions) where the NDVI value is high correspond to vegetation portions while portions (valley portions) where the NDVI value is low correspond to soil portions.

For example, the (1a) NDVI image 52 in FIG. 9 is inputted to the averaging section 121, and the averaging section 121 executes an averaging process thereon.

A specific example of the averaging process that is executed by the averaging section 121 will be explained with reference to FIG. 10.

Figure 10:
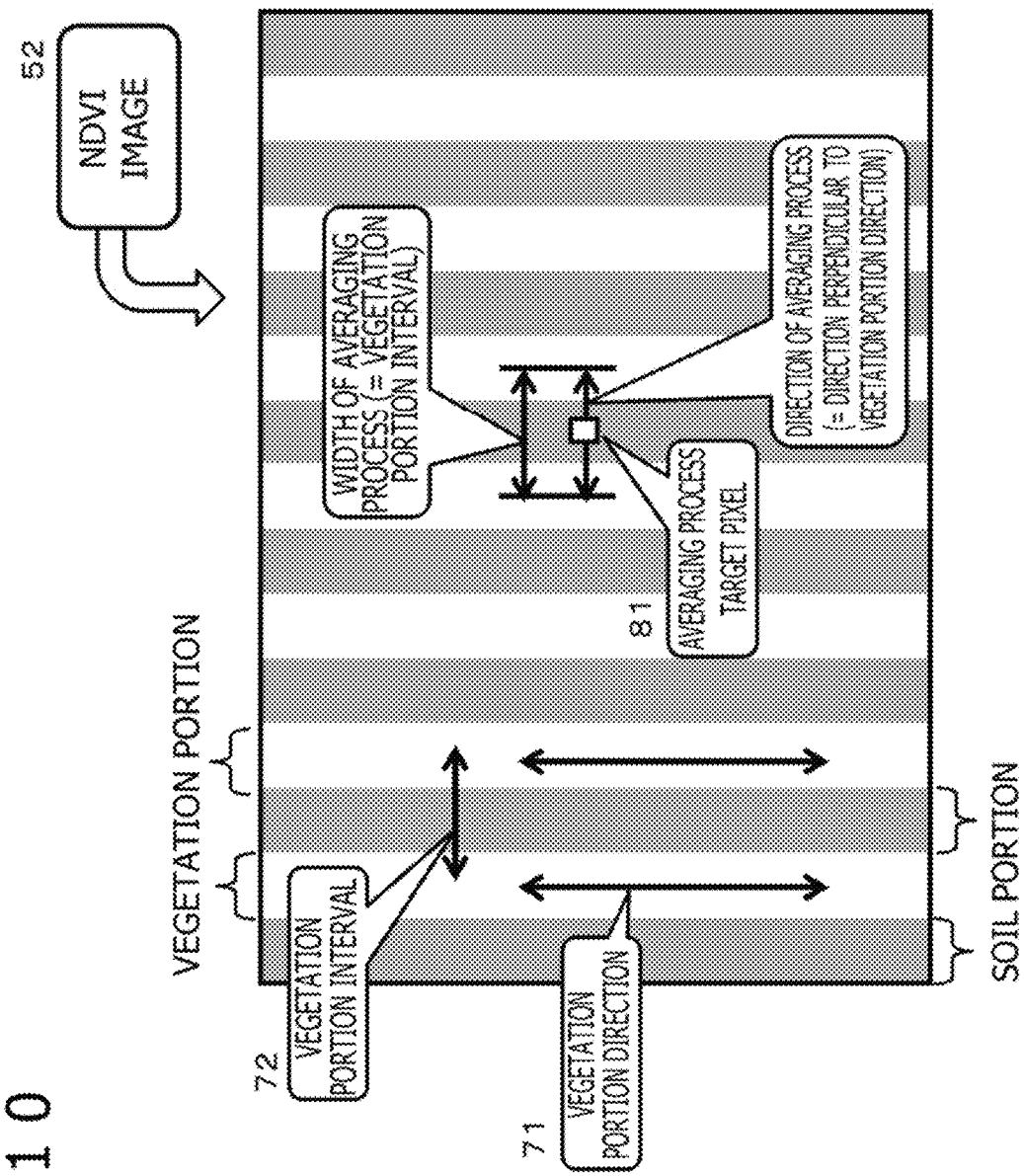
FIG. 10 is a diagram for explaining the details of a process that is executed by an averaging section of the NDVI image correction section.

FIG. 10 depicts the NDVI image 52 which is to be subjected to the averaging process.

First, the averaging section 121 acquires a vegetation portion direction 71 and a vegetation portion interval 72 from the NDVI image 52 which is a target to be subjected to the averaging process. In the example depicted in FIG. 10, the vegetation portion direction 71 is an up-down direction in the drawing.

It is to be noted that the vegetation portion direction 71 and the vegetation portion interval 72 are acquired through image analysis of the NDVI image 52 which is a target to be subjected to the averaging process. However, a user may confirm the image and input the vegetation portion direction 71 and the vegetation portion interval 72. Alternatively, the vegetation portion direction 71 and the vegetation portion interval 72 may be acquired with reference to a preset sketch of the farm.

In a certain farm, a vegetation portion direction and a vegetation portion interval vary in each region in some cases. In such a case, vegetation portion directions and vegetation portion intervals in respective regions may be acquired, and then, a process explained below may be performed for each region.

Next, the averaging section 121 executes an averaging process on pixel values (NDVI values) set for respective pixels in the NDVI image 52 on the basis of the acquired vegetation portion direction 71 and the acquired vegetation portion interval 72.

The averaging process is performed for each pixel in the NDVI image 52. A process to be performed on a process target pixel 81 in FIG. 10 will be explained. For the process target pixel 81, a plurality of pixels, which is arranged in a direction perpendicular to the vegetation portion direction 71 and is disposed within the vegetation portion interval 72 in which the process target pixel 81 is disposed at the center, is selected, and the averaging process is performed on the pixel values (NDVI values) of the selected pixels.

Each vegetation portion interval 72 includes pixels of one vegetation portion line and pixels of one soil portion line. Therefore, an average pixel value of the pixels included in a certain vegetation portion interval 72 is a local average value of a vegetation portion and a soil portion.

The averaging section 121 performs the pixel-based averaging process on each of all the pixels constituting the NDVI image 52. That is, the pixel-based averaging process is performed while the process target pixel is sequentially changed from the upper left end to the lower right end in the NDVI image 52. Through what is called a moving average pixel value calculating process, the average pixel value of each of the pixels is calculated.

Figure 11:
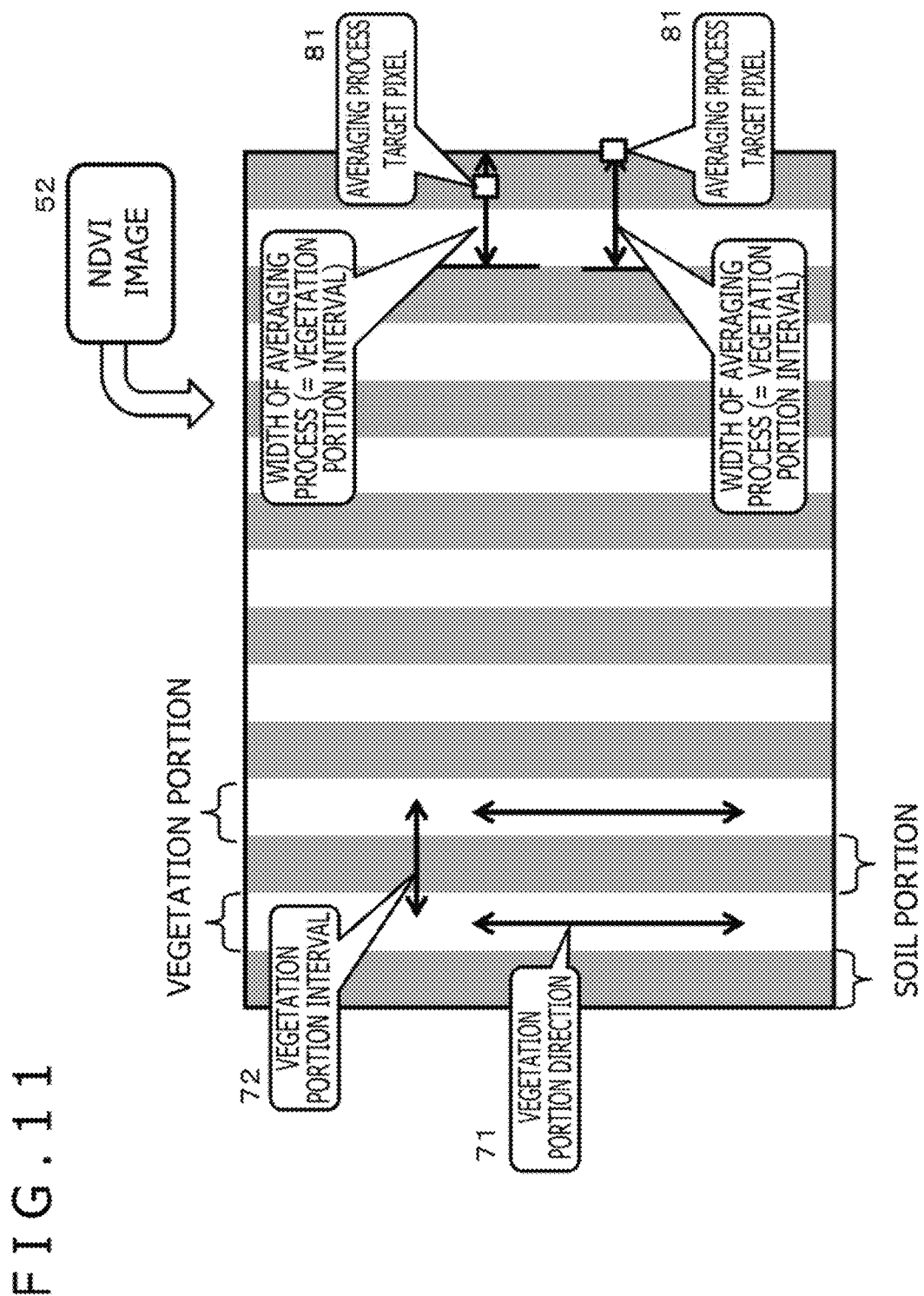
FIG. 11 is a diagram for explaining the details of a process that is executed by the averaging section of the NDVI image correction section.

It is to be noted that, for a region where pixels cannot be selected in a vegetation portion interval centered on a process target pixel because the process target pixel is in an end region of the image, the process target pixel 81 is not set at the center, and pixels disposed in a range which includes the process target pixel 81, pixels corresponding to one vegetation portion line, and pixels corresponding to one soil portion line, are selected as averaging target pixels, as depicted in FIG. 11, for example, and the averaging process is performed thereon.

In the abovementioned manner, an average pixel value of the pixel values (NDVI values) of a plurality of pixels that is arranged in a direction perpendicular to the vegetation portion direction and is disposed within a vegetation portion interval with respect to the process target pixel is calculated, and the calculated pixel value is set as a pixel value of the process target pixel.

The averaging section 121 executes this process on each of all the pixels in the NDVI image 52 to generate an averaged image.

Figure 12:
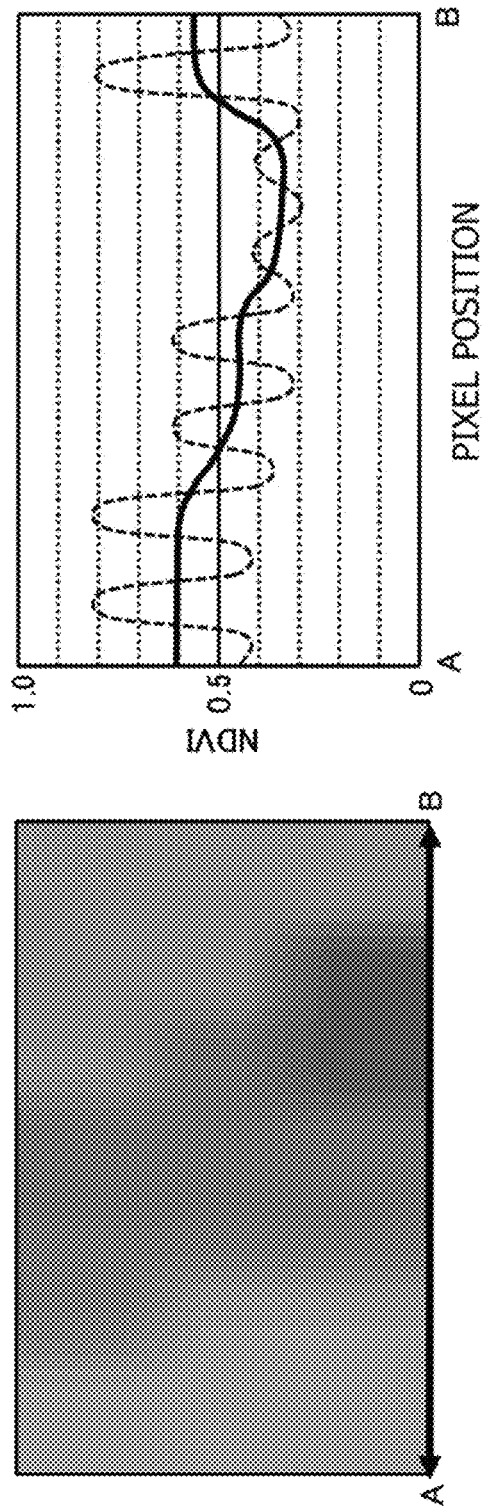
FIG. 12 is a diagram for explaining the details of a process that is executed by the averaging section of the NDVI image correction section.

FIG. 12 depicts an example of the averaged image which is generated as a result of the averaging process.

(2a) of FIG. 12 illustrates an averaged image which is generated as a result of the abovementioned averaging process performed on the NDVI image 52.

It is to be noted that (2b) of FIG. 12 indicates the NDVI value or the average pixel value (average NDVI value) of the lowermost pixel line AB in the (2a) averaged image in FIG. 12, for reference. The horizontal axis indicates the pixel position on the pixel line AB. The vertical axis indicates the NDVI value of each pixel.

A graph indicated by a solid line indicates the average pixel value (average NDVI value).

A dotted line indicates an NDVI value in the inputted original NDVI image 52 before executing the averaging process.

(3-2. Process that is Executed by Subtraction Section 122)

Next, a process that is executed by the subtraction section 122 will be explained.

The following two images are inputted to the subtraction section 122.

(1) the inputted original NDVI image 52 before executing the averaging process, and (2) the averaged image (=(2a) averaged image in FIG. 12) generated by the averaging section 121

By using the two inputted images, the subtraction section 122 subtracts a pixel value in the averaged image from a pixel value in the inputted original NDVI image 52.

That is, the pixel value of a pixel in the averaged image is subtracted from the pixel value of the corresponding pixel in the inputted original NDVI image 52, and a difference image including pixel values obtained as the subtraction result is generated.

A differential pixel value (differential NDVI value) which is the pixel value of each pixel constituting the difference image is as follows.

> Differential pixel value (differential NDVI value) in the difference image=(pixel value (NDVI value) in the inputted NDVI image)−(average pixel value (average NDVI value) in the averaged image)

The subtraction section 122 performs the above subtraction process on each of all the pixels in the inputted NDVI image 52, and generates a difference image including differential pixel values (differential NDVI values) obtained as the subtraction result.

Figure 13:
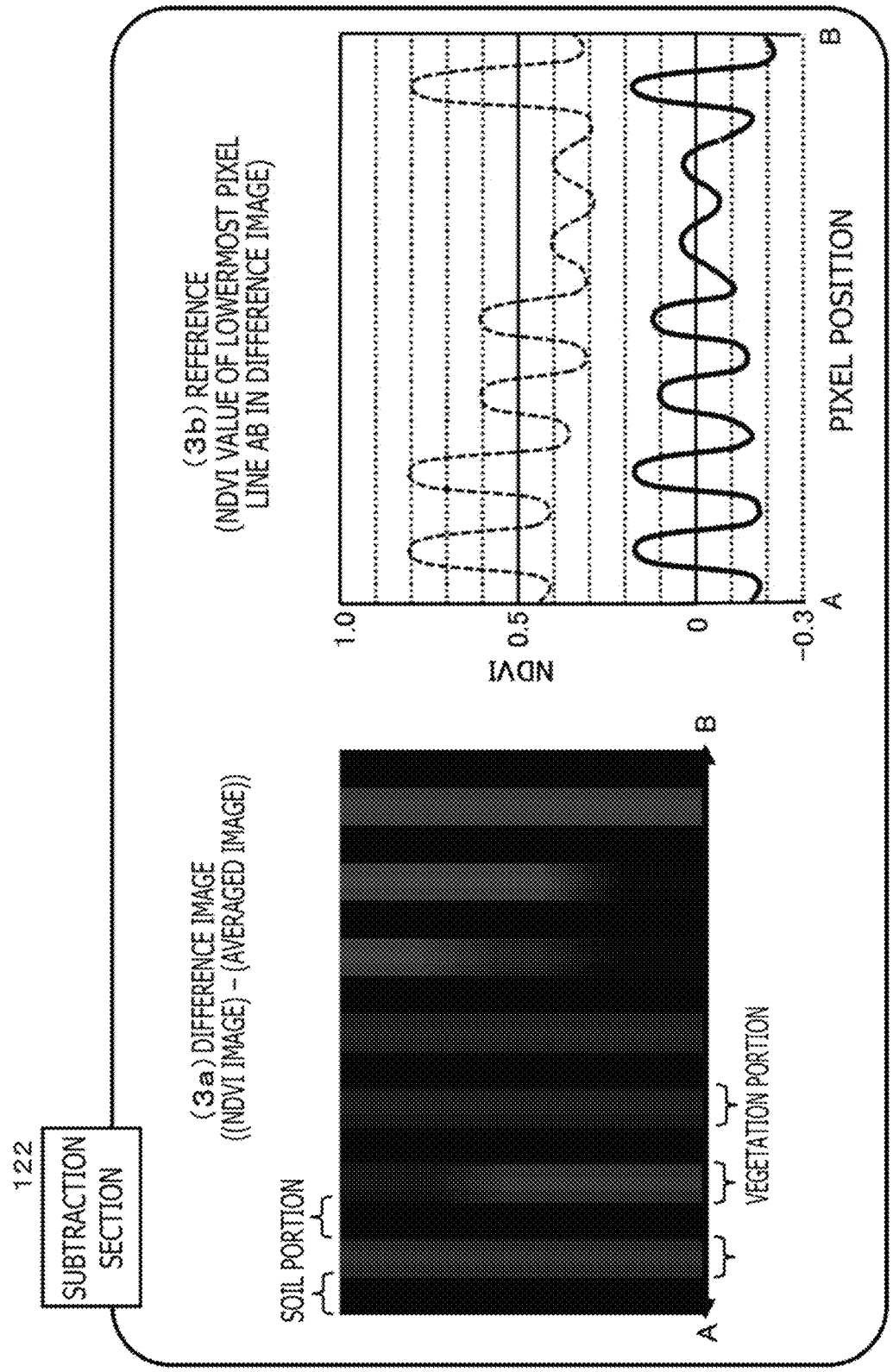
FIG. 13 is a diagram for explaining the details of a process that is executed by a subtraction section of the NDVI image correction section.

FIG. 13 depicts an example of the difference image that is generated as a result of the subtraction process at the subtraction section 122.

(3a) of FIG. 13 depicts a difference image that is generated as a result of the abovementioned subtraction process.

A differential pixel value (differential NDVI value) that is the pixel value of each pixel constituting the difference image is as follows.

> Differential pixel value (differential NDVI value) in the difference image=(pixel value (NDVI value) in the inputted NDVI image)−(average pixel value (average NDVI value) in the averaged image)

It is to be noted that (3b) of FIG. 13 illustrates an NDVI value or a differential pixel value (differential NDVI value) of the lowermost pixel line AB in the (3a) difference image in FIG. 13, for reference. The horizontal axis indicates a pixel position on the pixel line AB. The vertical axis indicates the NDVI value of each pixel.

A graph indicated by a solid line indicates a differential pixel value (differential NDVI value) in the difference image.

A dotted line indicates an NDVI value in the inputted original NDVI image 52.

As depicted in (3b) of FIG. 13, the NDVI value in the inputted original NDVI image 52 ranges from 0 to 1.0 while the differential pixel value (differential NDVI value) in the difference image ranges from a minus value to a plus value with "0" interposed therebetween.

(3-3. Process that is Executed by Binarization Section 123)

Next, a process that is executed by the binarization section 123 will be explained.

The binarization section 123 binarizes the pixel values or the differential pixel values (differential NDVI values) of the pixels constituting the difference image (=the (3a) difference image in FIG. 13) generated by the subtraction section 122.

The binarization section 123 binarizes the pixel values of the pixels constituting the difference image (=(3a) difference image in FIG. 13) generated by the subtraction section 122. That is, a pixel value=1 is set for a differential pixel value (differential NDVI value) that is positive (plus), and a pixel value=0 is set for a differential pixel value that is equal to 0 or is negative (minus).

That is, the binarization section 123 binarizes the differential pixel values (differential NDVI values) of the pixels constituting the difference image (=(3a) difference image in FIG. 13) generated by the subtraction section 122, and generates a binarized image including binarized pixel values (binarized NDVI values) which are 0 or 1.

Figure 14:
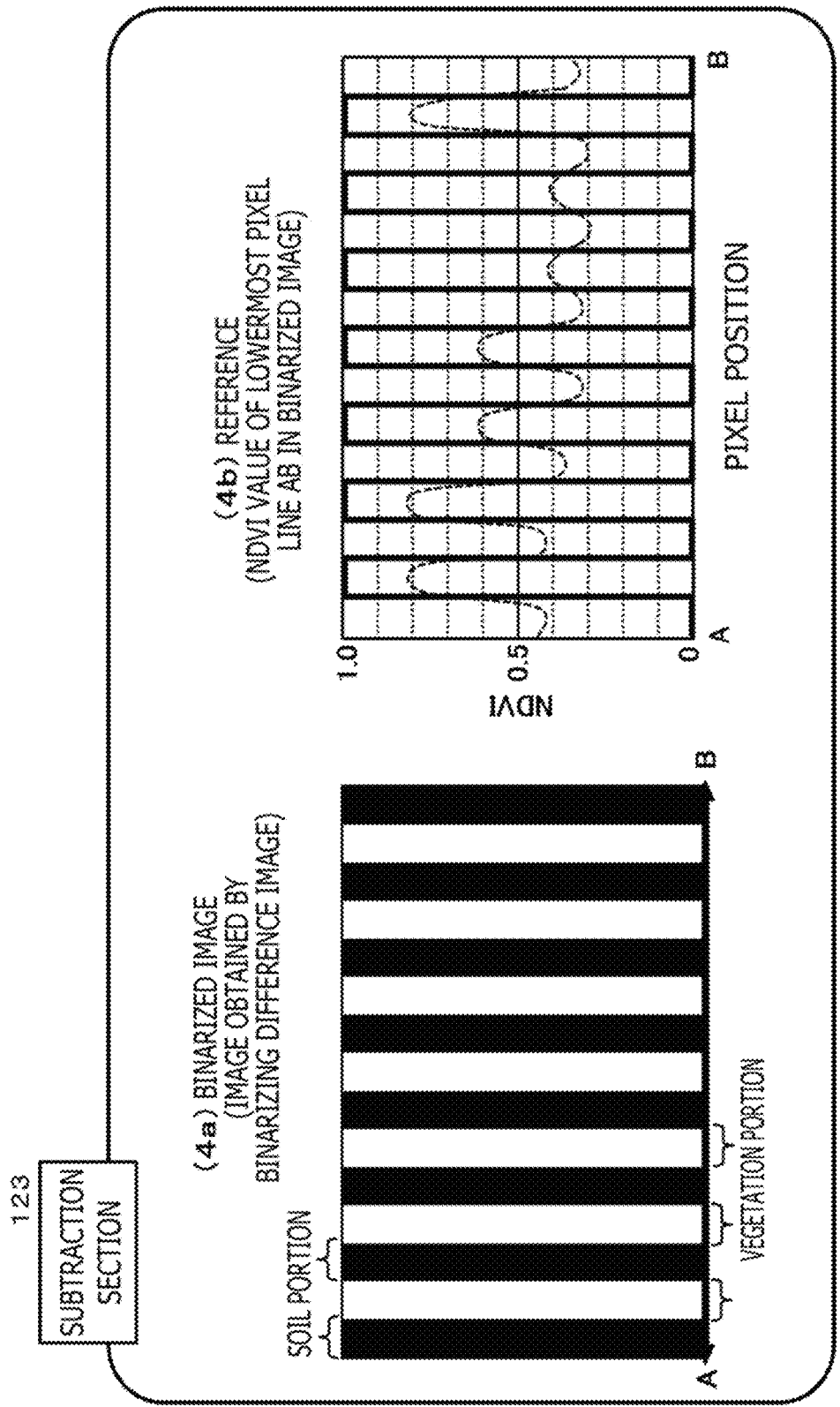
FIG. 14 is a diagram for explaining the details of a process that is executed by a binarization section of the NDVI image correction section.

FIG. 14 illustrates an example of a binarized image that is generated as a result of the binarization process at the binarization section 123.

(4a) in FIG. 14 depicts a binarized image that is generated as a result of the abovementioned binarization process.

The binarized pixel values (binarized NDVI values) which are the pixel values of the pixels constituting the binarized image are 0 or 1.

That is, in the binarized image, a pixel value=1 is set in a case where a corresponding pixel in the difference image (=(3a) difference image in FIG. 13) generated by the subtraction section 122 has a differential pixel value (differential NDVI value) that is positive (plus), and a pixel value=0 is set in a case where a corresponding pixel in the difference image has a differential pixel value is equal to 0 or is negative (minus).

It is to be noted that (4b) in FIG. 14 illustrates the NDVI value, that is, a binarized pixel value (binarized NDVI value) of the lowermost pixel line AB of the (4a) binarized image in FIG. 14, for reference. The horizontal axis indicates a pixel position on the pixel line AB. The vertical axis indicates the NDVI value of each pixel.

A graph indicated by a solid line indicates a binarized pixel value (binarized NDVI value) in the binarized image.

A dotted line indicates an NDVI value in the inputted original NDVI image 52.

As illustrated in (4b) of FIG. 14, a binarized pixel value (binarized NDVI value) in the binarized image is 0 or 1.

In the binarized image generated by the binarization section 123, a portion where the binarized pixel value (binarized NDVI value)=1 can be assessed as a vegetation portion. On the other hand, a portion where the binarized pixel value (binarized NDVI value)=0 can be assessed as a soil portion.

It is to be noted that the process example, in which the binarization section 123 generates a binarized image in which a pixel value=1 is set in a case where a corresponding differential pixel value (differential NDVI value) in the difference image is positive (plus), and a pixel value=0 is set in a case where a corresponding differential pixel value in the difference image is equal to 0 or is negative (minus), has been explained. That is, an example of the binarization process using a threshold=0 has been explained.

The binarization section 123 may perform a process other than the above process. For example, the binarization section 123 may perform binarization using, as the threshold, a value other than "0" such as threshold=0.1, threshold=0.2, or threshold=−0.1.

(3-4. Process that is Executed by Multiplication Section 124)

Next, a process that is executed by the multiplication section 124 will be explained.

The following two images are inputted to the multiplication section 124.

(1) the inputted original NDVI image 52, and
(2) the binarized image generated by the binarization section 123 (=(4a) binarized image in FIG. 14)

By using these two inputted images, the multiplication section 124 multiplies the pixel values in the inputted NDVI image 52 with the corresponding pixel values in the binarized image.

That is, the pixel value of a pixel in the input NDVI image 52 is multiplied with the pixel value of the corresponding pixel in the binarized image, and a multiplication image including pixel values obtained as the multiplication result is generated.

A multiplication pixel value (multiplication NDVI value) which is a pixel value of each pixel constituting the multiplication image is as follows.

Multiplication pixel value (multiplication NDVI value) in the multiplication image=(pixel value (NDVI value) in the inputted NDVI image)× (binarized pixel value (binarized NDVI value) in the binarized image)

The multiplication section 124 performs the abovementioned multiplication process on each of all the pixels in the inputted NDVI image 52, and generates a multiplication image including multiplication pixel values (multiplication NDVI values) obtained as the multiplication result.

Figure 15:
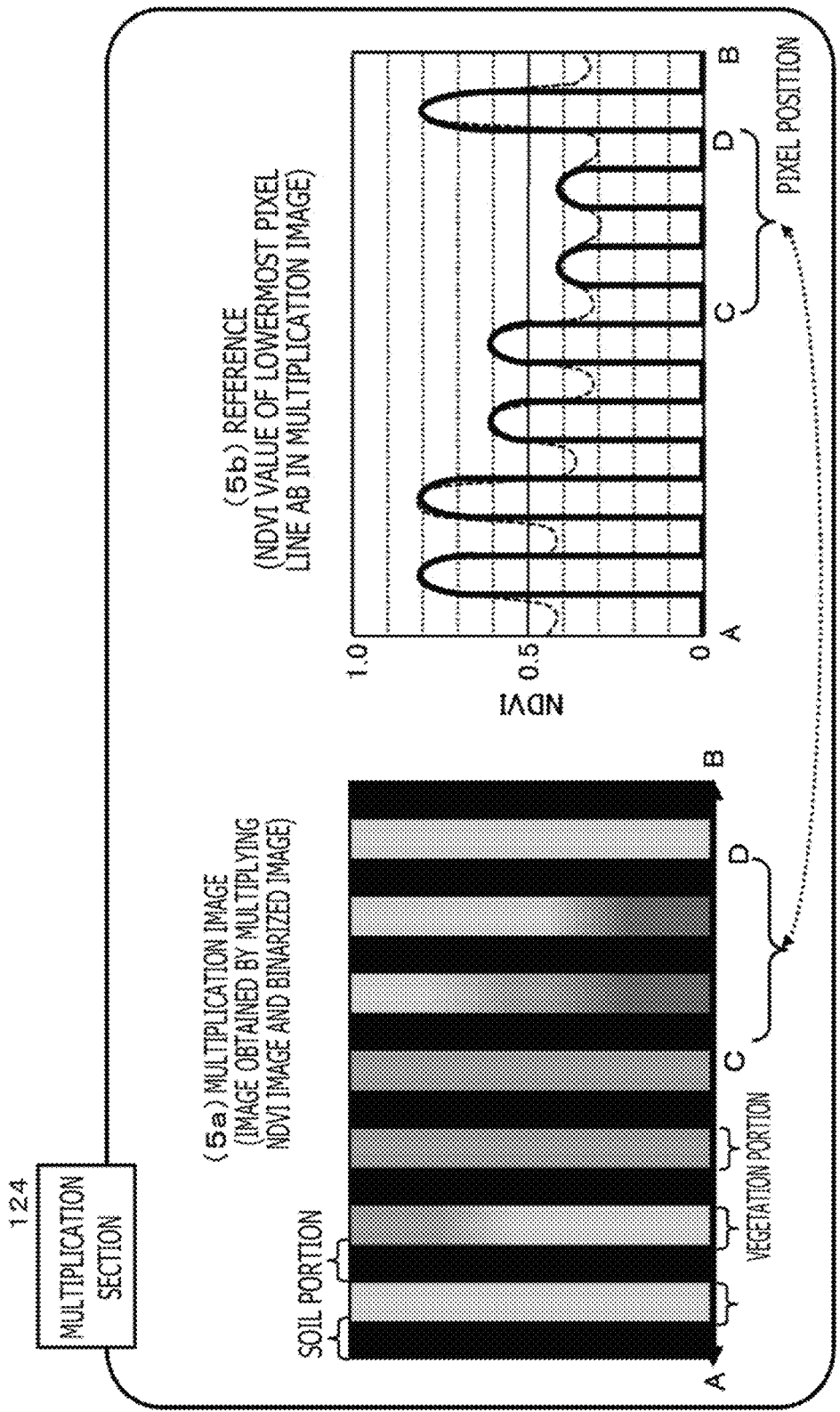
FIG. 15 is a diagram for explaining the details of a process that is executed by a multiplication section of the NDVI image correction section.

FIG. 15 depicts an example of a multiplication image that is generated as a result of the multiplication process at the multiplication section 124.

(5a) in FIG. 15 depicts a multiplication image that is generated as a result of the abovementioned multiplication process.

A multiplication pixel value (multiplication NDVI value) which is the pixel value of each pixel constituting the multiplication image is as follows.

Multiplication pixel value (multiplication NDVI value) in the multiplication image=(pixel value (NDVI value) in the inputted NDVI image)× (binarized pixel value (binarized NDVI value) in the binarized image)

It is to be noted that (5b) in FIG. 15 illustrates an NDVI value, that is, the multiplication pixel value (multiplication NDVI value) of the lowermost pixel line AB in the (5a) multiplication image in FIG. 15, for reference. The horizontal axis indicates a pixel position on the pixel line AB. The vertical axis indicates the NDVI value of each pixel.

A graph indicated by a solid line indicates a multiplication pixel value (multiplication NDVI value) in the multiplication image.

A dotted line indicates an NDVI value in the inputted original NDVI image 52.

As illustrated in (5b) of FIG. 15, a multiplication pixel value (multiplication NDVI value) in the multiplication image indicated by a solid line reflects a pixel value (NDVI value) of a peak portion (=vegetation portion) in the inputted original NDVI image 52 indicated by a dotted line, and a pixel value of 0 is set in a valley portion (soil portion).

That is, regarding each vegetation portion in the multiplication image, a pixel value (NDVI value) in the inputted original NDVI image 52 is reflected. Regarding each soil portion in the multiplication image, a pixel value (NDVI value)=0 is uniformly set.

Regarding the poor growth region CD portion, a pixel value (NDVI value) in the inputted original NDVI image 52 is also reflected in a multiplication pixel value (multiplication NDVI value) in the multiplication image, as is clear from the graph illustrated in (5b) of FIG. 15.

The (5a) multiplication image in FIG. 15 is outputted as the output image (corrected NDVI image) 53 depicted in FIGS. 7 and 8 to the image displaying section 103, and is displayed.

In the (5a) multiplication image in FIG. 15, all the pixel values (NDVI values) in each soil portion are uniformly set to 0 (black which indicates the minimum pixel value). A user (image observer) can easily discern that the black regions indicate soil portions while non-black regions indicate vegetation portions.

Furthermore, if the pixel value (NDVI value) setting states in the non-black regions are observed, the plant activities in the respective regions can be analyzed.

In addition, a user (image observer) can confirm that, in the CD region on the lower right side of the (5a) multiplication image in FIG. 15, the regions other than the 0 (black which indicates the minimum pixel value) regions indicate vegetation regions and that these vegetation regions in the CD region each have a lower pixel value (NDVI value) and a lower plant activity than those in the other vegetation regions.

It is to be noted that the (5a) multiplication image in FIG. 15 may be outputted as the output image (corrected NDVI image) 53 to the image displaying section 103, and may be displayed. However, the multiplication image may be further outputted to the multiplication image averaging section 125 depicted in FIG. 8, an averaged multiplication image may be generated at the multiplication image averaging section 125, and the generated image may be used as the output image (corrected NDVI image) 53.

(3-5. Process that is Executed by Multiplication Image Averaging Section 125)

Next, a process that is executed by the multiplication image averaging section 125 will be explained.

A process at the multiplication image averaging section 125 is not required but optional, as previously explained.

The multiplication image averaging section 125 performs the averaging process on the multiplication image generated by the multiplication section 124, generates an averaged multiplication image, and outputs the generated image as the output image (corrected NDVI image) 53 to the image displaying section 103.

A process that is executed by the multiplication image averaging section 125 will be explained with reference to FIG. 16.

Figure 16:
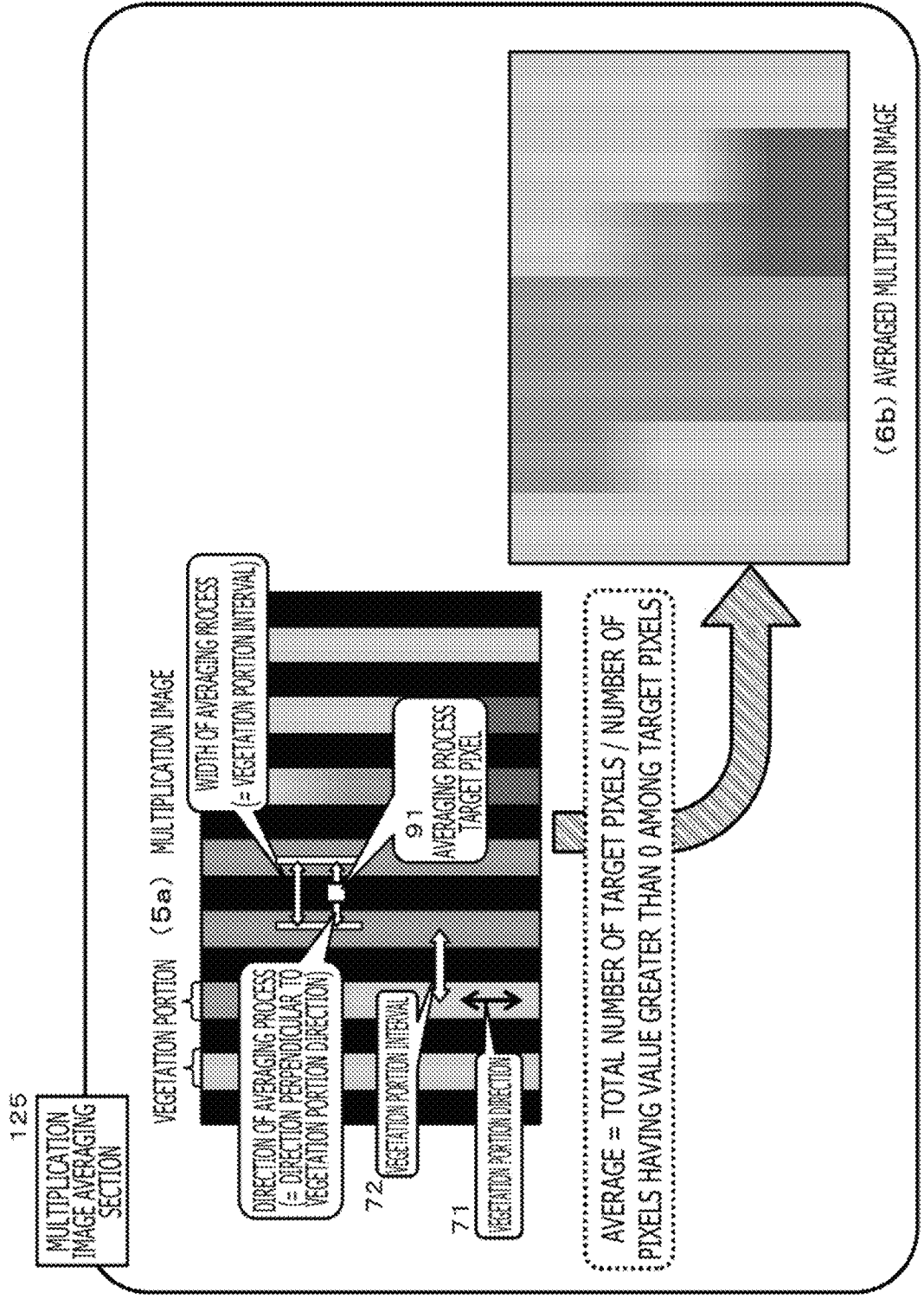
FIG. 16 is a diagram for explaining the details of a process that is executed by a multiplication image averaging section of the NDVI image correction section.

FIG. 16 illustrates a (5a) multiplication image.

This is a multiplication image that is generated by the multiplication section 124.

The multiplication image averaging section 125 performs the averaging process on the (5a) multiplication image excluding pixel values (NDVI pixel values)=0 in soil regions.

It is to be noted that pixel values (NDVI values)=0 are set in all the soil portion regions in the (5a) multiplication image. The multiplication image averaging section 125 performs the averaging process on regions excluding the soil regions where a pixel value=0 is set.

Specifically, the following process of calculating an average pixel value is performed for each pixel in the (5a) multiplication image.

Average pixel value=(total pixel value in the averaging process range)/(the number of pixels having a pixel value>0 in the averaging process range)

A specific process sequence will be explained. First, the multiplication image averaging section 125 acquires the vegetation portion direction 71 and the vegetation portion interval 72 from the (5a) multiplication image in FIG. 16. In the example depicted in FIG. 16, the vegetation portion direction 71 corresponds to the up-down direction in the drawing.

Next, the multiplication image averaging section 125 performs the averaging process on the pixel values (NDVI values) set for respective pixels in the (5a) multiplication image in FIG. 16 on the basis of the acquired vegetation portion direction 71 and the acquired vegetation portion interval 72.

A process that is performed on a process target pixel 91 in (5a) of FIG. 16 will be explained. For the process target pixel 91, a plurality of pixels that is arranged in a direction perpendicular to the vegetation portion direction 71 and included in the vegetation portion interval 72 centered on the process target pixel 91 are selected, and the averaging process is performed on the pixel values (multiplication pixel values (multiplication NDVI values)) of the selected pixels.

The average pixel value which is obtained by the averaging process is calculated in accordance with the following expression, as previously explained.

Average pixel value=(total pixel values of the pixels in the averaging process range)/(the number of pixels having a pixel value>0 in the averaging process range)

This pixel-based averaging process is performed on each of all the pixels constituting the (5a) multiplication image in FIG. 16. That is, the pixel-based averaging process is performed while a process target pixel is sequentially changed from the upper left end to the lower right end of the (5a) multiplication image in FIG. 16. Through what is called a moving average pixel value calculating process, an average pixel value is calculated for each pixel.

It is to be noted that, for a region where pixels cannot be selected in a vegetation portion interval centered on a process target pixel because the process target pixel is in an end region of the image, a process that is similar to that previously explained with reference to FIG. 11 is performed. That is, the process target pixel is not set at the center, and pixels disposed in a range which includes the process target pixel and within which a number of pixels corresponding to the vegetation portion interval are included are selected as averaging target pixels, and the averaging process is performed thereon.

In the abovementioned manner, an average pixel value of the pixel values (NDVI values) of a plurality of pixels that is arranged in a direction perpendicular to the vegetation portion direction and is included in a vegetation portion interval with respect to a process target pixel is calculated, and the calculated pixel value is set as a pixel value of the process target pixel.

The multiplication image averaging section 125 calculates the averaged multiplication pixel value for each of all the pixels in the (5a) multiplication image in FIG. 16, and generates an averaged multiplication image in (6b) of FIG. 16.

The multiplication image averaging section 125 outputs the (6b) averaged multiplication image in FIG. 16 as the output image (corrected NDVI image) 53 to the image displaying section 103.

Figure 17:
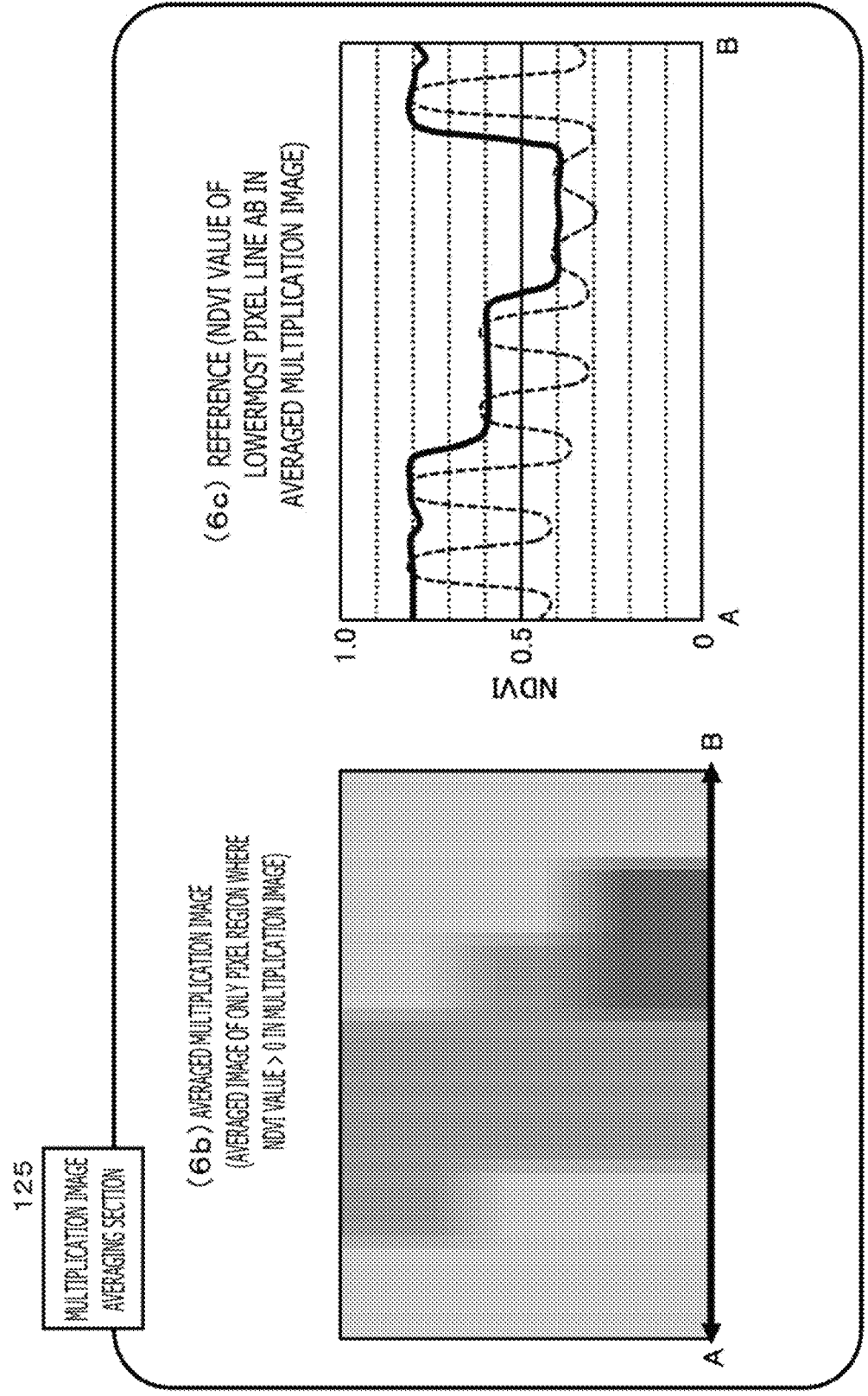
FIG. 17 is a diagram for explaining the details of a process that is executed by the multiplication image averaging section of the NDVI image correction section.

FIG. 17 depicts an example of an averaged multiplication image that is generated by the multiplication image averaging section 125.

An image in (6b) of FIG. 17 is identical to the (6b) averaged multiplication image in FIG. 16, and is generated as a result of the averaging process performed on the multiplication image generated by the multiplication section 124.

It is to be noted that (6c) of FIG. 17 indicates an NDVI value of the lowermost pixel line AB of the (6b) averaged multiplication image in FIG. 17, that is, the averaged multiplication pixel value (averaged multiplication NDVI value), for reference. The horizontal axis indicates a pixel position on the pixel line AB. The vertical axis indicates the NDVI value of each pixel.

A graph indicated by a solid line indicates an averaged multiplication pixel value (averaged multiplication NDVI value).

A dotted line indicates an NDVI value in the inputted original NDVI image 52.

The (6b) averaged multiplication image in FIG. 17 includes index values indicating plant activities of vegetation portions only without any soil portion, that is, NDVI values corresponding to vegetation portions only. The plant activity of each vegetation portion region can be surely discerned without the necessity of considering the existence of soil portions.

4. Sequence of Processes that are Executed by Image Processing Device According to Present Disclosure Next, a sequence of processes that are executed by an image processing device according to the present disclosure will be explained.

Figure 18:
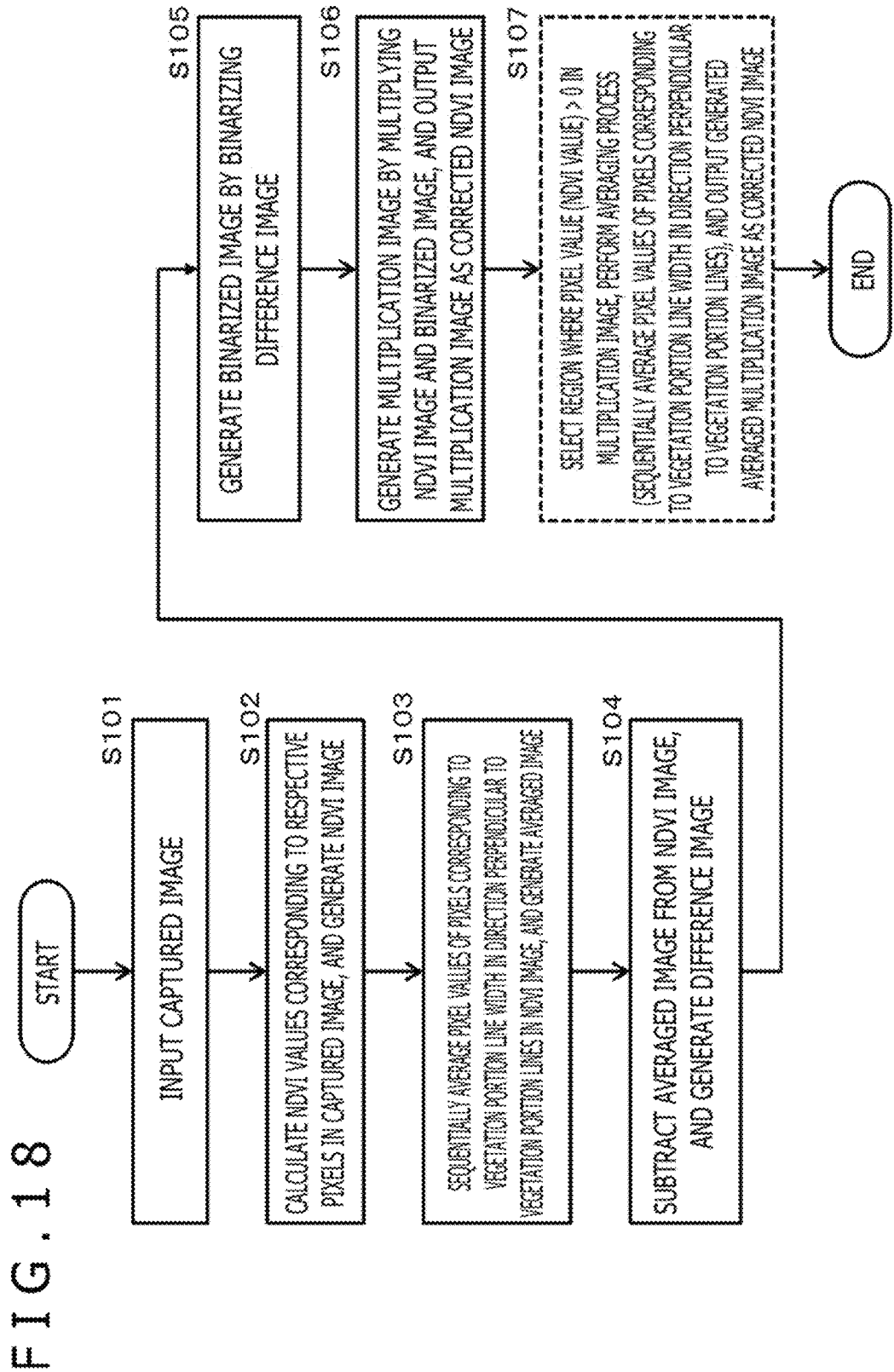
FIG. 18 is a flowchart for explaining a detailed sequence of processes that are executed by the image processing device according to the present disclosure.

FIG. 18 depicts a flowchart for explaining a sequence of processes that are executed by the image processing device according to the present disclosure.

It is to be noted that processes based on the flowchart in FIG. 18 can be executed in accordance with a program stored in a storage unit of the image processing device 100, for example. The processes are executed under control of a data processing unit (control unit) including a CPU or the like having a program executing function, for example.

Hereinafter, steps in the flowchart in FIG. 18 will be explained in order.

(Step S101)

First, at step S101, the image processing device receives an input of a captured image.

The captured image is an image captured by the camera 11 mounted on the drone 10 depicted in FIG. 1, for example. The camera 11 is a multi-spectral camera. From the captured image 51, the intensity (pixel value) of a RED (infrared) wavelength (approximately 0.63 to 0.69 μm) and the intensity (pixel value) of a NIR (near infrared) wavelength (approximately 0.76 to 0.90 μm) can be acquired.

(Step S102)

Next, at step S102, the image processing device 100 calculates an NDVI value corresponding to each pixel in the captured image, and generates an NDVI image.

This step is executed by the NDVI image generating section 101 depicted in FIG. 7.

The NDVI image generating section 101 receives an input of the captured image 51, and calculates an NDVI value of each pixel in the captured image 51 according to the abovementioned (Expression 1), that is, NDVI=($NIR-RED$)/($NIR+RED$)     (Expression 1)

in which RED (infrared) and NIR (near infrared) represent the intensity (pixel value) of a RED (infrared) wavelength (approximately 0.63 to 0.69 μm) and the intensity of an NIR (near infrared) wavelength (approximately 0.76 to 0.90 μm), respectively.

The NDVI image generating section 101 calculates an NDVI value of each pixel in the captured image, and generates an NDVI image in which the calculated pixel value (NDVI value) is set for each pixel.

The NDVI image is the NDVI image 52 which has been explained with reference to (1a) in FIG. 9, for example.

Figure 19:
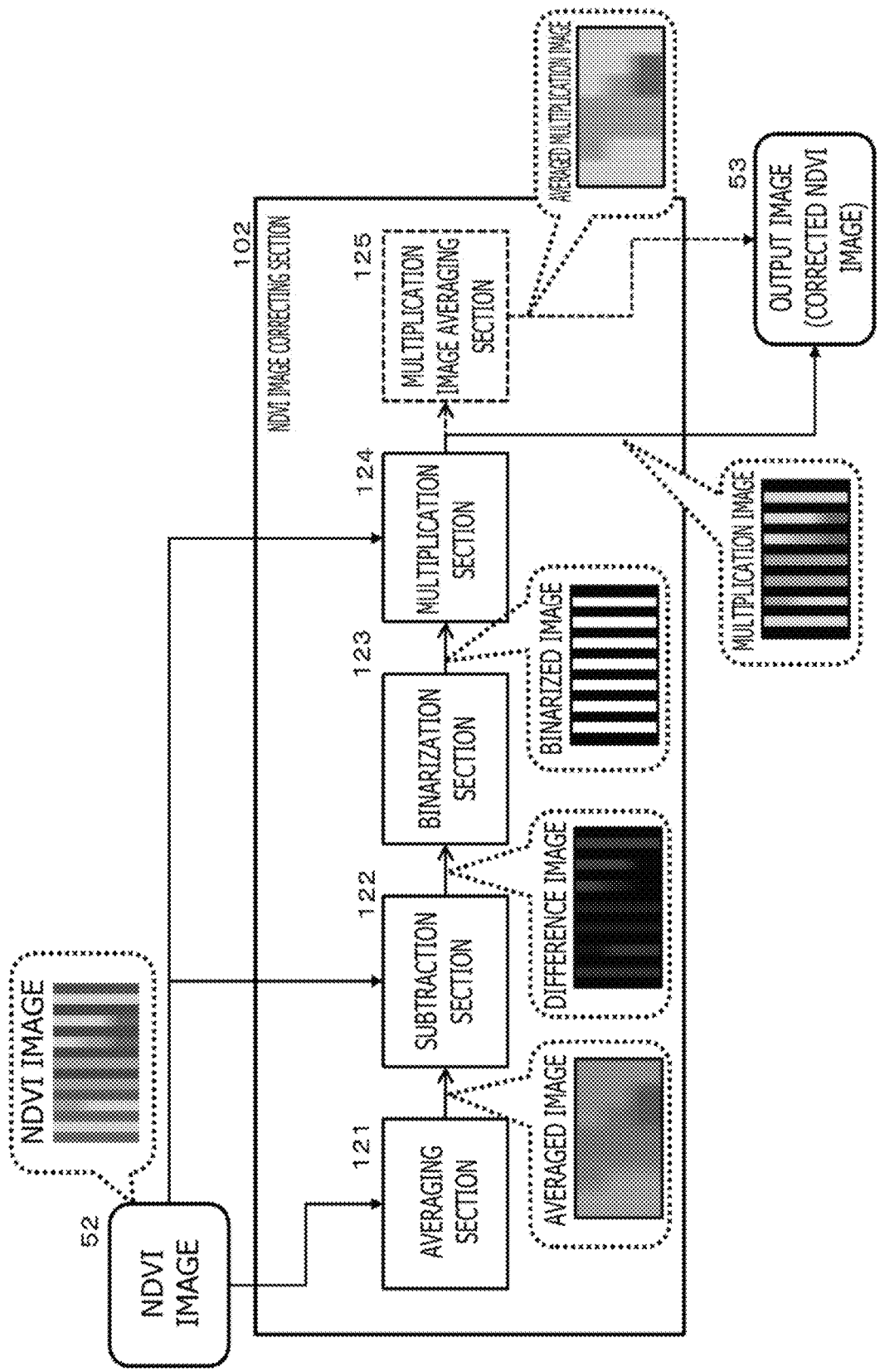
FIG. 19 is a diagram for explaining the details of a process that is executed by the NDVI image correction section of the image processing device according to the present disclosure.

It is to be noted that an example of the NDVI image generated at step S102 and a series of images that are generated by the sections in the NDVI image correcting section 102 that corrects the NDVI image are depicted in FIG. 19.

Hereinafter, steps S103 and later will be explained with reference to FIG. 19.

(Step S103)

Next, at step S103, the image processing device 100 averages the pixel values of pixels corresponding to the width of a vegetation portion line sequentially to a direction perpendicular to the vegetation portion line in the NDVI image, and generates an averaged image.

This step is executed by the averaging section 121 of the HDVI image correcting section 102 depicted in FIG. 19.

The NDVI image generated by the NDVI image generating section 101 is inputted to the averaging section 121 of the NDVI image correcting section 102, and the averaging section 121 generates an averaged image of the inputted NDVI image.

This step is the process that has been explained with reference to FIGS. 10 and 12. For each of all pixels in the NDVI image, a plurality of pixels that is arranged in a direction perpendicular to the vegetation portion direction and is included in a vegetation portion interval is selected, and an average pixel value of the pixel values (NDVI values) of the selected pixels is calculated, and then, an averaged image in which the calculated pixel values are set as average pixel values (average NDVI values) is generated.

The averaged image is an output of the averaging section 121 depicted in FIG. 19.

(Step S104)

Next, at step S104, the image processing device 100 subtracts a pixel value in the averaged image from the corresponding pixel value in the NDVI image generated at step S102, and generates a difference image including the difference pixel values (differential NDVI values).

This step is executed by the subtraction section 122 of the NDVI image correcting section 102 depicted in FIG. 19.

The following two images are inputted to the subtraction section 122.

(1) the inputted original NDVI image before executing the averaging process, and (2) the averaged image (=(2a) averaged image in FIG. 12) generated by the averaging section By using these two inputted images, the subtraction section 122 subtracts a pixel value in the averaged image from the corresponding pixel value in the NDVI image, and generates a difference image.

A differential pixel value (differential NDVI value) which is the pixel value of each pixel constituting the difference image is as follows.

Differential pixel value (differential NDVI value) in the difference image=(pixel value (NDVI value) in the inputted NDVI image)−(average pixel value (average NDVI value) in the averaged image)

It is to be noted that a differential pixel value (differential NDVI value) in the difference image ranges from a minus value to a plus value, as previously explained with reference to FIG. 13.

(Step S105)

Next, at step S105, the image processing device 100 binarizes pixel values, that is, differential pixel values (differential NDVI values) of pixels constituting the difference image, and generates a binarized image.

This step is executed by the binarization section 123 of the NDVI image correcting section 102 depicted in FIG. 19.

The binarization section 123 binarizes the pixel values of the pixels constituting the difference image generated by the subtraction section 122. That is, the binarization process of setting a pixel value=1 for a differential pixel value (differential NDVI value) that is positive (plus) and setting a pixel value=0 for a differential pixel value that is equal to 0 or is negative (minus) is performed, and a binarized image including the binarized pixel values (binarized NDVI values) which are 0 or 1 is generated.

A binarized pixel value (binarized NDVI value) in the binarized image is 0 or 1, as previously explained with reference to (4b) in FIG. 14.

In the binarized image generated by the binarization section 123, a portion having a binarized pixel value (binarized NDVI value)=1 can be assessed as a vegetation portion. On the other hand, a portion having a binarized pixel value (binarized NDVI value)=0 can be assessed as a soil portion.

(Step S106)

Next, at step S106, by using two inputted images which are the NDVI image generated at step S102 and the binarized image generated at step S105 by the binarization section 123, the image processing device 100 multiplies a pixel value in the NDVI image and a pixel value in the binarized image, and generates a multiplication image including the multiplication pixel value.

This step is executed by the multiplication section 124 of the NDVI image correcting section 102 depicted in FIG. 19.

By using two inputted images which are the NDVI image generated at step S102 and the binarized image generated at step S105 by the binarization section 123, the multiplication section 124 multiplies a pixel value in the NDVI image and a pixel value in the binarized image, and generates a multiplication image.

A multiplied pixel value (multiplication NDVI value) which is a pixel value of each pixel constituting the multiplication image is as follows.

Multiplication pixel value (multiplication NDVI value) in the multiplication image=(pixel value (NDVI value) in the inputted NDVI image)× (binarized pixel value (binarized NDVI value) in the binarized image)

One example of the multiplication image generated as a result of the multiplication process at the multiplication section 124 is the (5a) multiplication image in FIG. 15 previously explained with reference to FIG. 15.

As previously explained with reference to (5b) in FIG. 15, a multiplication pixel value (multiplication NDVI value), in the multiplication image indicated by the solid line reflects a pixel value (NDVI value) of a peak portion (=vegetation portion) in the inputted original NDVI image 52 indicated by the dotted line, and a pixel value of 0 is set for a valley portion (soil portion).

That is, regarding each vegetation portion in the multiplication image, a pixel value (NDVI value) in the inputted original NDVI image 52 is reflected. Regarding each soil portion in the multiplication image, a pixel value (NDVI value)=0 is uniformly set.

The (5a) multiplication image in FIG. 15 is outputted as the output image (corrected NDVI image) 53 depicted in FIGS. 7 and 8 to the image displaying section 103, and is displayed.

In the (5a) multiplication image in FIG. 15, all the pixel values (NDVI values) in each soil portion are uniformly set to 0 (black which indicates the minimum pixel value). A user can easily discern that the black regions indicate soil portions and non-black regions indicate vegetation portions. Furthermore, if the pixel value (NDVI value) setting states in the non-black regions are observed, the plant activities in the respective regions can be analyzed.

The vegetation region portion in the CD region on the lower right side of the (5a) multiplication image in FIG. 15 can be determined to have lower pixel values (NDVI values) and lower plant activities than the other vegetation portions.

(Step S107)

Step S107 is executed by the multiplication image averaging section 125 of the NDVI image correcting section 102 depicted in FIG. 19, and can be skipped because this step is optional.

At step S107, the image processing device 100 performs the averaging process on the multiplication image generated at step S106, and generates an averaged multiplication image.

This step is executed by the multiplication image averaging section 125, as previously explained with reference to FIGS. 16 and 17.

The multiplication image averaging section 125 performs the averaging process on the multiplication image generated at step S106, excluding soil portions where a pixel value (NDVI pixel value)=0.

It is to be noted that, in the (5a) multiplication image in FIG. 16, a pixel value (NDVI value)=0 is uniformly set in each soil portion region, as previously explained with reference to FIG. 16. The multiplication image averaging section 125 performs the averaging process on the image excluding the soil regions where a pixel value=0.

Specifically, the following average pixel value calculating process is performed on each of the pixels in the (5a) multiplication image.

Average pixel value=(total pixel value of the pixels in the averaging process region)/(the number of pixels having a pixel value>0 in the averaging process region)

A specific process sequence thereof will be explained. First, the multiplication image averaging section 125 acquires the vegetation portion direction 71 and the vegetation portion interval 72 from the (5a) multiplication image in FIG. 16. In the example depicted in FIG. 16, the vegetation portion direction 71 corresponds to the up-down direction in the drawing.

Next, the multiplication image averaging section 125 performs the averaging process on pixel values (NDVI values) set for respective pixels in the (5a) multiplication image in FIG. 16 on the basis of the acquired vegetation portion direction 71 and the acquired vegetation portion interval 72.

The average pixel value which is obtained by the averaging process is calculated in accordance with the following expression, as previously explained.

Average pixel value=(total pixel values of the pixels in the averaging process range)/(the number of pixels having a pixel value>0 in the averaging process range)

This pixel-based averaging process is performed on each of all the pixels constituting the (5a) multiplication image in FIG. 16. That is, the pixel-based averaging process is performed while a process target pixel is sequentially changed from the upper left end to the lower right end of the (5a) multiplication image of FIG. 16. Through what is called a moving average pixel value calculating process, an average pixel value is calculated for each pixel.

It is to be noted that, for a region where pixels cannot be selected in a vegetation portion interval centered on a process target pixel because the process target pixel is in an end region of the image, a process that is similar to that previously explained with reference to FIG. 11 is performed. That is, the process target pixel is not set at the center, and pixels disposed in a range which includes the process target pixel and within which a number of pixels corresponding to the vegetation portion interval are included are selected as averaging target pixels, and the averaging process is performed thereon.

In the abovementioned manner, an average pixel value of the pixel values (NDVI values) of a plurality of pixels that is arranged in a direction perpendicular to the vegetation portion direction and is included in a vegetation portion interval with respect to a process target pixel is calculated, and the calculated pixel value is set as a pixel value of the process target pixel.

The multiplication image averaging section 125 calculates an averaged multiplication pixel value of each of all the pixels in the (5a) multiplication image of FIG. 16, generates the (6b) averaged multiplication image in FIG. 16, and outputs the averaged multiplication image as the output image (corrected NDVI image) 53 to the image displaying section 103.

The averaged multiplication image generated by the multiplication image averaging section 125 includes index values indicating plant activities of vegetation portions only without any soil portion, that is, including NDVI values corresponding to vegetation portions only. The plant activity of each vegetation portion region can be surely discerned without the necessity of considering the existence of soil portions.

5. Hardware Configuration Example of Image Processing Device

Next, a hardware configuration example of an image processing device according to the present disclosure will be explained with reference to FIG. 20. The hardware depicted in FIG. 20 is one specific hardware configuration example of an image processing device according to the present disclosure.

A CPU (Central Processing Unit) 301 functions as a control section or a data processing section that executes various processes in accordance with a program stored in a ROM (Read Only Memory) 302 or a storage section 308. For example, the CPU 301 executes processes in accordance with the sequences that have been explained in the above embodiment. Data and a program to be executed by the CPU 301 are stored in a RAM (Random Access Memory) 303. The CPU 301, the ROM 302, and the RAM 303 are mutually connected via a bus 304.

The CPU 301 is connected to the input/output interface 305 via the bus 304. An input section 306 which includes switches, a keyboard, a mouse, a microphone, a sensor, or the like, and an output section 307 which includes a display, a loud speaker, or the like are connected to the input/output interface 305.

The CPU 301 executes various processes in response to commands inputted from the input section 306, and outputs the process results to the output section 307, for example.

A storage section 308 is connected to the input/output interface 305, and includes a hard disk, for example. Various types of data and a program to be executed by the CPU 301 are stored in the storage section 308. A communication section 309 functions as a transmission/reception section for Wi-Fi communication, Bluetooth (registered trademark) (BT) communication, or data communication over a network such as the Internet or a local area network, and communication with an external device.

A drive 310 which is connected to the input/output interface 305, drives a removable medium 311 such as a magnetic disk, an optical disk, a magneto-optical disk, or a semiconductor memory such as a memory card, and executes data recording or data reading.

6. Conclusion of Configuration According to Present Disclosure

An embodiment of the present disclosure has been explained above in detail with reference to the particular embodiment. However, it is obvious that a person skilled in the art can make modification or substitution on the embodiment within the gist of the present disclosure. That is, the present invention has been disclosed in a form of exemplifications, and thus, should not be limitedly interpreted. In order to assess the gist of the present disclosure, the claims should be considered.

It is to be noted that the technology disclosed herein can have the following configurations.

(1) An image processing device including:
a vegetation index value set image correcting section that receives an input of a vegetation index value set image in which a vegetation index value is set as a pixel value and that generates a corrected image of the vegetation index value set image, the vegetation index value indicating a plant activity, in which
the vegetation index value set image correcting section
calculates, for each of pixels constituting the vegetation index value set image, an average pixel value of the pixel and neighboring pixels, and generates an averaged image in which the calculated average pixel values are set,
generates a binarized image by binarizing a difference image between the vegetation index value set image and the averaged image in accordance with a specified threshold, and
generates, as the corrected image of the vegetation index value set image, a multiplication image by multiplying the vegetation index value set image and the binarized image.

(2) The image processing device according to (1), in which
the vegetation index value set image is an NDVI (Normalized Difference Vegetation Index) image in which an NDVI value is set as a pixel value.

(3) The image processing device according to (1) or (2), in which
the vegetation index value set image is generated on the basis of a camera image that includes a vegetation portion and a soil portion,
the vegetation index value set image correcting section includes an averaging section that generates the averaged image, and
the averaging section
acquires a vegetation portion direction and a vegetation portion interval of the vegetation portion included in the vegetation index value set image,
calculates, as the average pixel value of a process target pixel, an average value of pixel values of pixels that are arranged in a direction perpendicular to the vegetation portion direction and are disposed within the vegetation portion interval including the process target pixel, and
generates the averaged image in which the average pixel values calculated for the respective pixels constituting the vegetation index value set image are set.

(4) The image processing device according to (3), in which
the vegetation portion interval is a pixel interval within which pixels corresponding to one vegetation portion line and pixels corresponding to one soil portion line are disposed, and
the averaging section calculates, as the average pixel value of the process target pixel, an average value of pixel values of pixels that are disposed within the vegetation portion interval including the process target pixel and that include pixels corresponding to one vegetation portion line and pixels corresponding to one soil portion line.

(5) The image processing device according to (3) or (4), in which
by performing image analysis on the vegetation index value set image, the averaging section acquires the vegetation portion direction and the vegetation portion interval of a vegetation portion included in the vegetation index value set image.

(6) The image processing device according to any one of (3) to (5), in which
from data inputted by a user, the averaging section acquires at least any of the vegetation portion direction or the vegetation portion interval.

(7) The image processing device according to any one of (1) to (6), in which
the vegetation index value set image correcting section includes a subtraction section that receives an input of the averaged image, and generates a difference image between the vegetation index value set image and the averaged image, and
the subtraction section subtracts a pixel value of each pixel in the averaged image from a pixel value of the corresponding pixel in the vegetation index value set image, and generates the difference image including pixel values obtained as the subtraction result.

(8) The image processing device according to any one of (1) to (7), in which
the vegetation index value set image is an NDVI (Normalized Difference Vegetation Index) image in which an NDVI value is set as a pixel value,
the NDVI value in the NDVI image ranges from 0.0 to 1.0, and the difference image is a difference image between the NDVI image and the averaged image, and includes a pixel having a pixel value of 0 or greater and a pixel having a pixel value of 0 or less.

(9) The image processing device according to any one of (1) to (8), in which
the vegetation index value set image correcting section includes a binarization section that binarizes the difference image in accordance with a specified threshold, and generates a binarized image, and
the binarization section
defines the specified threshold=0, and
generates the binarized image in which a pixel value=1 is set for each pixel constituting the difference image and having a pixel value that is positive, and a pixel value=0 is set for each pixel constituting the difference image and having a pixel value that is equal to 0 or is negative.

(10) The image processing device according to any one of (1) to (9), in which
the vegetation index value set image correcting section includes a binarization section that binarizes the difference image in accordance with a specified threshold, and generates a binarized image, and
the binarization section generates the binarized image by using a value other than "0" as the prescribed threshold.

(11) The image processing device according to any one of (1) to (10), in which
the vegetation index value set image correcting section includes a multiplication section that generates the multiplication image by multiplying the vegetation index value set image and the binarized image, and
the multiplication section multiplies a pixel value of each pixel in the vegetation index value set image with a pixel value of the corresponding pixel in the binarized image, and generates a multiplication image including pixel values obtained as the multiplication result.

(12) The image processing device according to (11), in which
each pixel value in the binarized image is set to 0 or 1, and
the multiplication section multiplies a pixel value of each pixel in the vegetation index value set image with a pixel value of the corresponding pixel set to 0 or 1 in the binarized image, and generates the multiplication image including a pixel value that is equal to 0 and a pixel value reflecting the pixel value in the vegetation index value set image as the multiplication result.

(13) The image processing device according to (11) or (12), in which
the vegetation index value set image is generated on the basis of a camera image that includes a vegetation portion and a soil portion, and
the multiplication section generates the multiplication image in which a pixel value=0 is set in a soil portion region.

(14) The image processing device according to any one of (1) to (13), in which
the vegetation index value set image correcting section includes a multiplication image averaging section that performs an averaging process on the multiplication image, and
the multiplication image averaging section calculates, for each of pixels constituting the multiplication image, an average pixel value of the pixel and neighboring pixels, generates an averaged multiplication image in which the calculated average pixel values are set, and uses the generated averaged multiplication image as the corrected image of the vegetation index value set image.

(15) The image processing device according to (14), in which
the multiplication image averaging section generates the averaged multiplication image by
generating an extracted vegetation portion image obtained by extracting, from the multiplication image, a vegetation portion region that is assessed as a vegetation portion only,
acquiring a vegetation portion direction and a vegetation portion interval in the generated extracted vegetation portion image,
calculating, as an average pixel value of a process target pixel, an average value of pixel values of pixels that are arranged in a direction perpendicular to the vegetation portion direction and are disposed within the vegetation portion interval including the process target pixel, and
enlarging the extracted vegetation portion image to an image size of the vegetation index value set image after calculating the average pixel values of respective pixels constituting the multiplication image.

(16) An image processing method that is executed in an image processing device, the image processing device including a vegetation index value set image correcting section that receives an input of a vegetation index value set image in which a vegetation index value indicating a plant activity is set as a pixel value and that generates a corrected image of the vegetation index value set image, the method including:
causing the vegetation index value set image correcting section to
calculate, for each of pixels constituting the vegetation index value set image, an average pixel value of the pixel and neighboring pixels, and generate an averaged image in which the calculated average pixel values are set,
generate a binarized image by binarizing a difference image between the vegetation index value set image and the averaged image in accordance with a specified threshold, and
generate, as the corrected image of the vegetation index value set image, a multiplication image by multiplying the vegetation index value set image and the binarized image.

(17) A program for causing an image processing device to execute image processing, the image processing device including a vegetation index value set image correcting section that receives an input of a vegetation index value set image in which a vegetation index value indicating a plant activity is set as a pixel value and that generates a corrected image of the vegetation index value set image, the program being configured to cause the vegetation index value set image correcting section to perform:
a process of calculating, for each of pixels constituting the vegetation index value set image, an average pixel value of the pixel and neighboring pixels, and generating an averaged image in which the calculated average pixel values are set;
a process of generating a binarized image by binarizing a difference image between the vegetation index value set image and the averaged image in accordance with a specified threshold; and
a process of generating, as the corrected image of the vegetation index value set image, a multiplication image by multiplying the vegetation index value set image and the binarized image.

Further, a series of the processes explained herein can be executed by hardware, software, or a composite structure thereof. In a case where the processes are executed by software, a program having a sequence of the processes recorded therein can be executed after being installed into a memory of a computer incorporated in dedicated hardware, or can be executed after being installed into a general-purpose computer capable of various processes. For example, such a program may be previously recorded in a recording medium. The program can be installed into the computer from the recording medium. Alternatively, the program can be received over a network such as a LAN (Local Area Network) or the Internet, and can be installed into a recording medium such as an internal hard disk.

It is to be noted that the processes described herein are not necessarily executed in the described time-series order, and the processes may be executed parallelly or separately, as needed or in accordance with the processing capacity of a device to execute the processes. Further, in the present description, a system refers to a logical set structure including a plurality of devices, and the devices in the structure are not necessarily included in the same casing.

INDUSTRIAL APPLICABILITY

According to the configuration of one embodiment of the present disclosure, a device and a method of generating and outputting a corrected image including a high-precision vegetation index value such as an NDVI value in a vegetation portion region on the basis of an image in which a vegetation portion and a soil portion coexist are implemented, as explained so far.

Specifically, the device includes a vegetation index value set image correcting section that generates a corrected image of a vegetation index value set image in which a vegetation index value such as an NDVI value is set as a pixel value, for example. The vegetation index value set image correcting section calculates, for each of pixels constituting the vegetation index value set image, an average pixel value of the pixel and neighboring pixels, generates an averaged image in which the average pixel value is set, generates a binarized image by binarizing a difference image between the vegetation index value set image and the averaged image in accordance with a specified threshold, and generates, as the corrected image of the vegetation index value set image, a multiplication image of the vegetation index value set image and the binarized image.

With this configuration, a device and a method of generating and outputting a corrected image including a high-precision vegetation index value such as an NDVI value in a vegetation portion region on the basis of an image in which the vegetation portion and a soil portion coexist, are implemented.

REFERENCE SIGNS LIST

10: Drone
11: Camera
20: Poor growth region
51: Captured image
52: NDVI image
53: Output image (corrected NDVI image)
71: Vegetation portion direction
72: Vegetation portion interval
81, 91: Averaging process target pixel
100: Image processing device
101: NDVI image generating section
102: NDVI image correcting section
103: Image displaying section
121: Averaging section
122: Subtraction section
123: Binarization section
124: Multiplication section
125: Multiplication image averaging section
301: CPU
302: ROM
303: RAM
304: Bus
305: Input/output interface
306: Input section
307: Output section
308: Storage section
309: Communication section
310: Drive
311: Removable medium

The invention claimed is:

1. An image processing device, comprising:
circuitry configured to:
receive a vegetation index value set image in which a vegetation index value is set as a pixel value;
generate a corrected image of the vegetation index value set image, wherein the vegetation index value indicates a plant activity;
calculate, for each of pixels that constitute the vegetation index value set image, a first average pixel value of a pixel and neighboring pixels;
generate an averaged image in which average pixel values calculated for the each of the pixels that constitute the vegetation index value set image are set;
binarize a difference image between the vegetation index value set image and the averaged image based on a threshold;
generate a binarized image based on the binarized difference image; and
generate, as the corrected image of the vegetation index value set image, a multiplication image based on multiplication of the vegetation index value set image and the binarized image.

2. The image processing device according to claim 1, wherein
the vegetation index value set image is an NDVI (Normalized Difference Vegetation Index) image in which an NDVI value is set as the pixel value.

3. The image processing device according to claim 1, wherein
the circuitry is further configured to:
generate the vegetation index value set image based on a camera image that includes a vegetation portion and a soil portion;
acquire a vegetation portion direction and a vegetation portion interval of the vegetation portion included in the vegetation index value set image;
calculate, as a second average pixel value of a process target pixel, a third average value of pixel values of pixels that are in a direction perpendicular to the vegetation portion direction and are within the vegetation portion interval that includes the process target pixel; and generate the averaged image in which the average pixel values calculated for the each of the pixels that constitute the vegetation index value set image are set.

4. The image processing device according to claim 3, wherein
the vegetation portion interval is a pixel interval within which pixels corresponding to one vegetation portion line and pixels corresponding to one soil portion line are disposed, and
the circuitry is further configured to calculate, as the second average pixel value of the process target pixel, the third average value of the pixel values of the pixels that are within the vegetation portion interval that includes the process target pixel and that include the pixels corresponding to the one vegetation portion line and the pixels corresponding to the one soil portion line.

5. The image processing device according to claim 3, wherein
based on image analysis on the vegetation index value set image, the circuitry is further configured to acquire the vegetation portion direction and the vegetation portion interval of the vegetation portion included in the vegetation index value set image.

6. The image processing device according to claim 3, wherein
based on data inputted by a user, the circuitry is further configured to acquire at least one of the vegetation portion direction or the vegetation portion interval.

7. The image processing device according to claim 1, wherein
the circuitry is further configured to:
acquire an input of the averaged image;
generate the difference image between the vegetation index value set image and the averaged image;
subtract a pixel value of each pixel in the averaged image from a pixel value of a corresponding pixel in the vegetation index value set image; and
generate the difference image that includes pixel values obtained as a subtraction result of the subtraction.

8. The image processing device according to claim 1, wherein
the vegetation index value set image is an NDVI (Normalized Difference Vegetation Index) image in which an NDVI value is set as the pixel value,
the NDVI value in the NDVI image ranges from 0.0 to 1.0,
the difference image is a difference image between the NDVI image and the averaged image, and
the difference image includes a first pixel having the pixel value of 0 or greater and a second pixel having the pixel value of 0 or less.

9. The image processing device according to claim 1, wherein
the circuitry is further configured to:
define the threshold=0, and
generate the binarized image in which the pixel value=1 is set for each first pixel that constitutes the difference image and has the pixel value that is positive, and the pixel value=0 is set for each second pixel that constitutes the difference image and has the pixel value that is equal to 0 or is negative.

10. The image processing device according to claim 1, wherein the circuitry is further configured to
generate the binarized image based on a value other than "0" as the threshold.

11. The image processing device according to claim 1, wherein the circuitry is further configured to:
generate the multiplication image based on the multiplication of the vegetation index value set image and the binarized image;
multiply a pixel value of each pixel in the vegetation index value set image with a pixel value of a corresponding pixel in the binarized image; and
generate the multiplication image that includes pixel values obtained as a multiplication result of the multiplication the pixel value of each pixel in the vegetation index value set image with a pixel value of the corresponding pixel in the binarized image.

12. The image processing device according to claim 11, wherein
each pixel value in the binarized image is set to 0 or 1, and
the circuitry is further configured to:
multiply the pixel value of the each pixel in the vegetation index value set image with the pixel value of the corresponding pixel set to 0 or 1 in the binarized image; and
generate the multiplication image that includes a first pixel value that is equal to 0 and a second pixel value that reflects the pixel value in the vegetation index value set image as the multiplication result.

13. The image processing device according to claim 11, wherein the circuitry is further configured to:
generate the vegetation index value set image based on a camera image that includes a vegetation portion and a soil portion; and
generate the multiplication image in which the pixel value=0 is set in a soil portion region.

14. The image processing device according to claim 1, wherein the circuitry is further configured to:
performs perform an averaging process on the multiplication image;
calculate, for each of pixels that constitute the multiplication image, the first average pixel value of the pixel and the neighboring pixels;
generate an averaged multiplication image in which the average pixel values calculated for the each of the pixels that constitute the multiplication image are set; and
use the generated averaged multiplication image as the corrected image of the vegetation index value set image.

15. The image processing device according to claim 14, wherein the circuitry is further configured to:
extract, from the multiplication image, a vegetation portion region that is assessed as a vegetation portion only;
generate an extracted vegetation portion image based on the extracted vegetation portion region that is assessed as the vegetation portion only;
generate the averaged multiplication image based on the generated extracted vegetation portion image;
acquiring acquire a vegetation portion direction and a vegetation portion interval in the generated extracted vegetation portion image:
calculate, as a second average pixel value of a process target pixel, a third average value of pixel values of pixels that are in a direction perpendicular to the vegetation portion direction and are within the vegetation portion interval that includes the process target pixel; and
enlarge the extracted vegetation portion image to an image size of the vegetation index value set image based on average pixel values calculated for the each of the pixels that constitute the multiplication image.

16. An image processing method that is executed in an image processing device, the method comprising:
- receiving a vegetation index value set image in which a vegetation index value is set as a pixel value;
- generating a corrected image of the vegetation index value set image, wherein the vegetation index value indicates a plant activity;
- calculating, for each of pixels constituting the vegetation index value set image, an average pixel value of a pixel and neighboring pixels;
- generating an averaged image in which average pixel values calculated for the each of the pixels constituting the vegetation index value set image are set;
- binarizing a difference image between the vegetation index value set image and the averaged image based on a threshold;
- generating a binarized image based on the binarized difference image; and
- generating, as the corrected image of the vegetation index value set image, a multiplication image based on multiplication of the vegetation index value set image and the binarized image.

17. A non-transitory computer-readable medium having stored thereon computer-executable instructions that, when executed by a computer, cause the computer to execute operations, the operations comprising:
- receiving a vegetation index value set image in which a vegetation index value is set as a pixel value;
- generating a corrected image of the vegetation index value set image, wherein the vegetation index value indicates a plant activity;
- calculating, for each of pixels constituting the vegetation index value set image, an average pixel value of a pixel and neighboring pixels;
- generating an averaged image in which average pixel values calculated for the each of the pixels constituting the vegetation index value set image are set;
- binarizing a difference image between the vegetation index value set image and the averaged image based on a threshold;
- generating a binarized image based on the binarized difference image; and
- generating, as the corrected image of the vegetation index value set image, a multiplication image based on multiplication of the vegetation index value set image and the binarized image.

* * * * *